(12) United States Patent
Sasaki et al.

(10) Patent No.: US 6,541,065 B1
(45) Date of Patent: Apr. 1, 2003

(54) THIN-FILM MAGNETIC HEAD AND METHOD OF MANUFACTURING SAME

(75) Inventors: Yoshitaka Sasaki, Milpitas, CA (US); Takehiro Kamigama, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 10/136,386

(22) Filed: May 2, 2002

(51) Int. Cl.⁷ .................................................. B05D 5/12
(52) U.S. Cl. ...................... 427/130; 427/130; 427/131; 427/132; 427/264; 427/265; 427/270; 427/271; 427/331; 427/402; 427/404
(58) Field of Search .................................. 427/130, 131, 427/132, 264, 265, 270, 271, 331, 402, 404

(56) References Cited

U.S. PATENT DOCUMENTS 6,043,959 A    3/2000   Crue et al.

FOREIGN PATENT DOCUMENTS

JP    2001-76316    3/2001

OTHER PUBLICATIONS

U.S. patent application Ser. No. 09/592,297, Sasaki et al., filed Jun. 12, 2000.

*Primary Examiner*—Bernard Pianalto
(74) *Attorney, Agent, or Firm*—Oliff & Berridge, PLC

(57) ABSTRACT

A thin-film magnetic head comprises a bottom pole layer, a top pole layer, a recording gap layer, and first and second thin-film coils. The bottom pole layer includes a first layer disposed to face toward the first and second thin-film coils, and second and third layers disposed closer to an air bearing surface than the first and second thin-film coils are. In a method of manufacturing the thin-film magnetic head, the first thin-film coil and the second layer are formed in this order on a magnetic layer that has a wholly flat top surface and is to be the first layer. Then, the magnetic layer is patterned to complete the first layer.

18 Claims, 31 Drawing Sheets

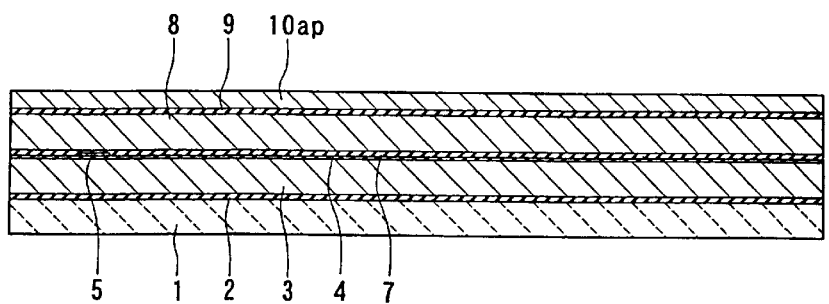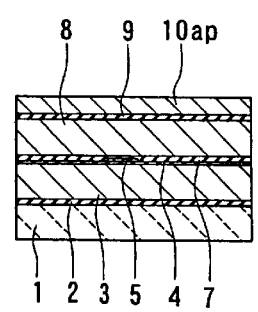
FIG. 1A          FIG. 1B
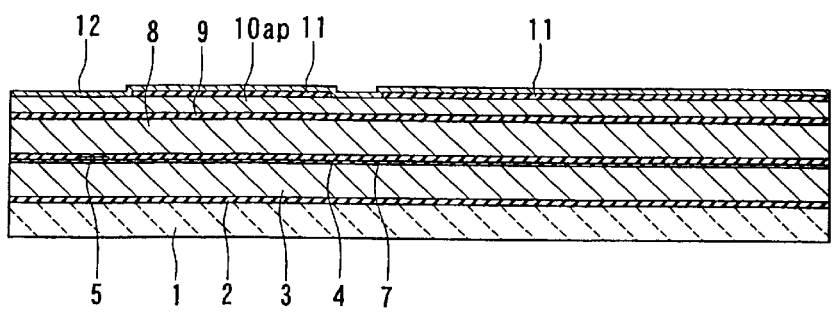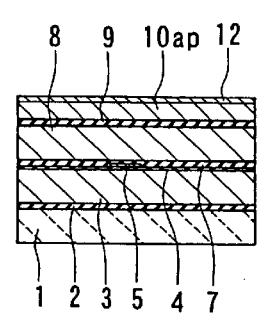
FIG. 2A          FIG. 2B

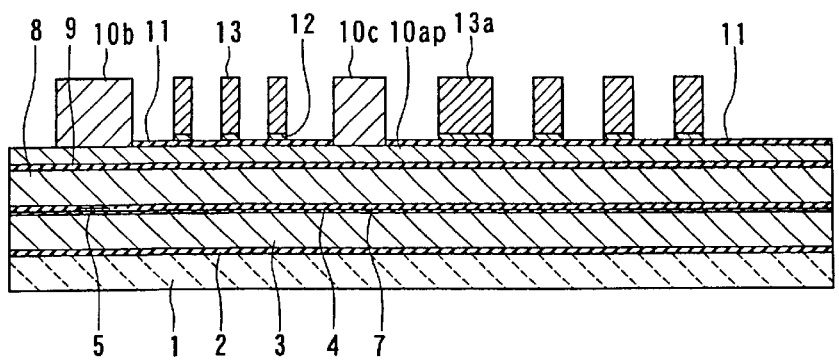 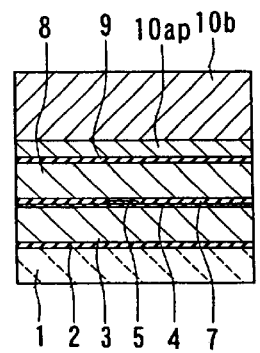
FIG. 5A　　　　　　　　　　FIG. 5B
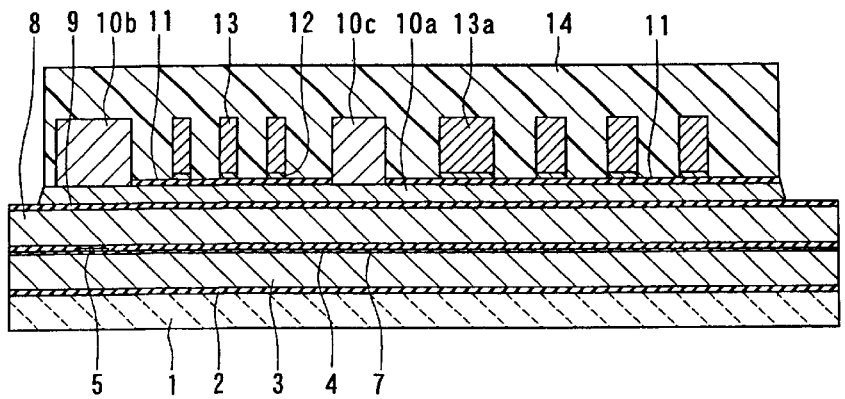 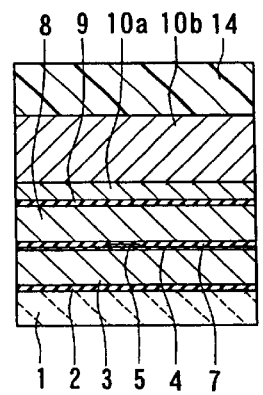
FIG. 6A　　　　　　　　　　FIG. 6B

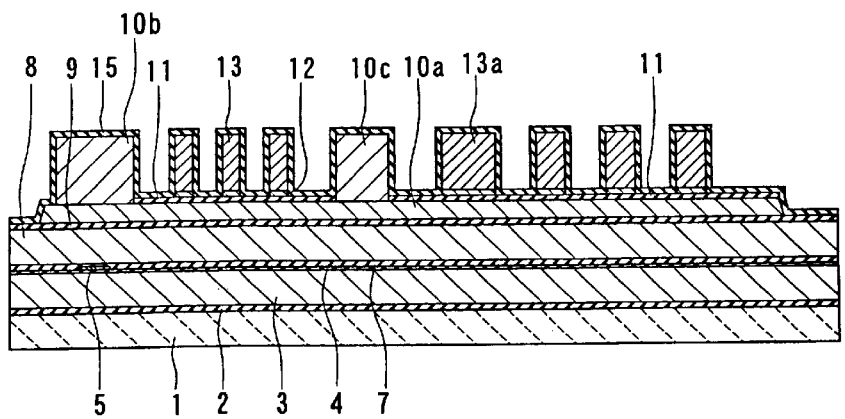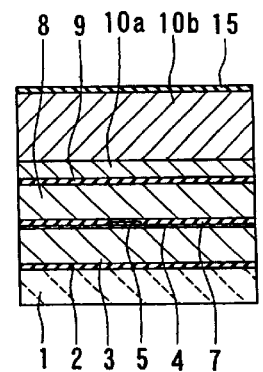
FIG. 7A  FIG. 7B
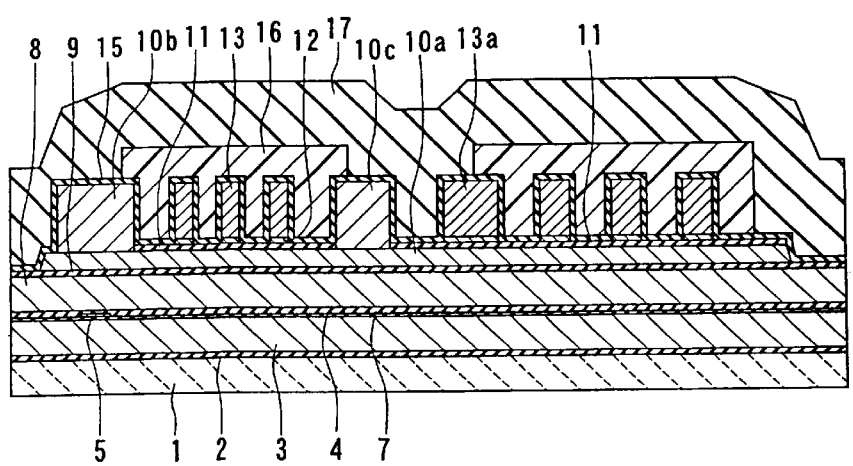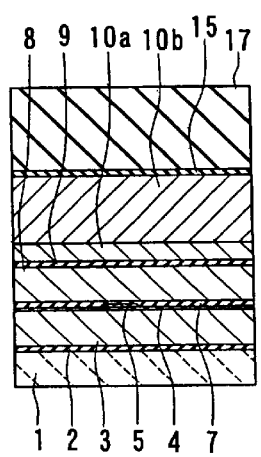
FIG. 8A  FIG. 8B

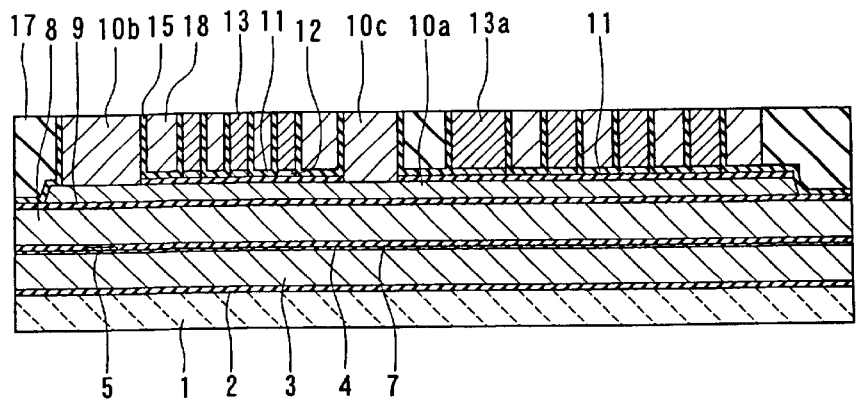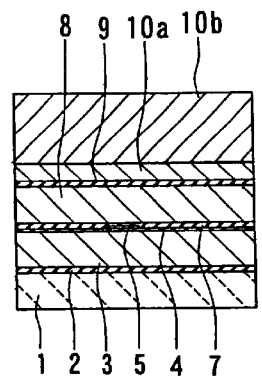
FIG. 11A  FIG. 11B
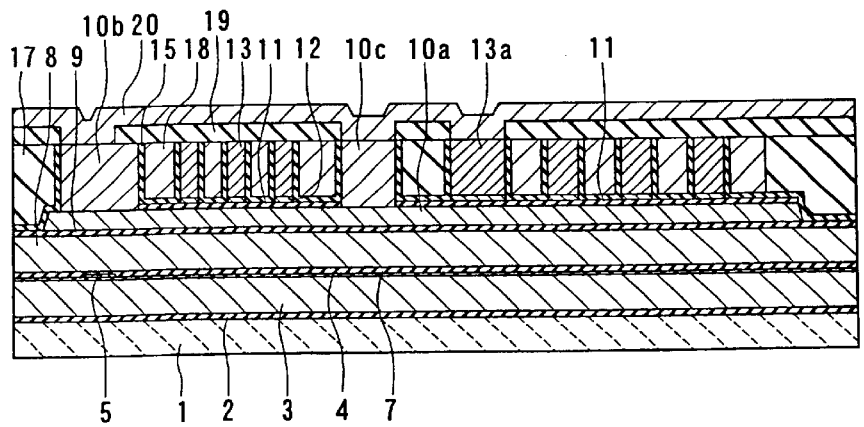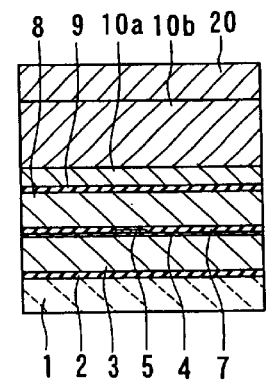
FIG. 12A  FIG. 12B

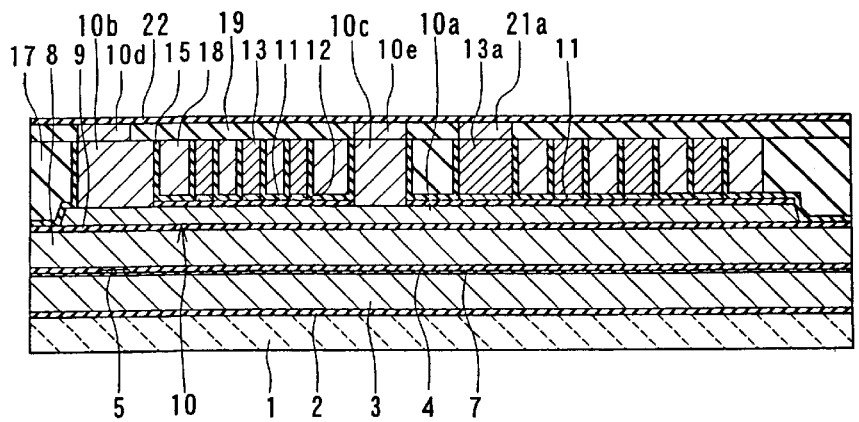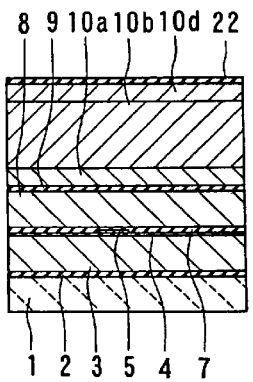
FIG. 13A  FIG. 13B
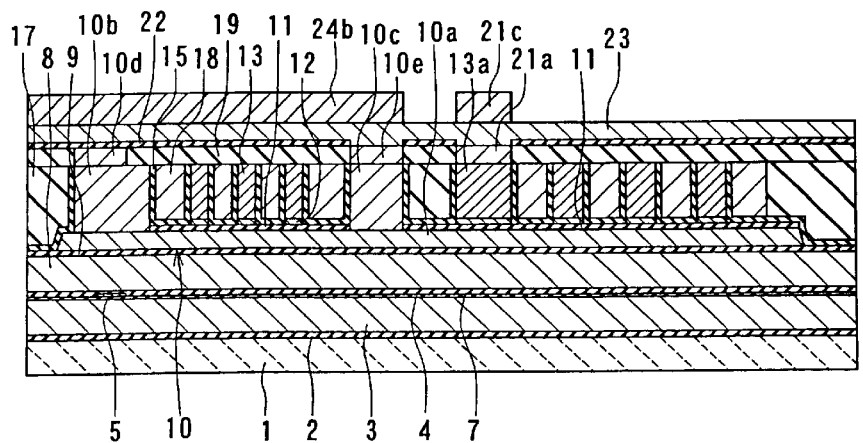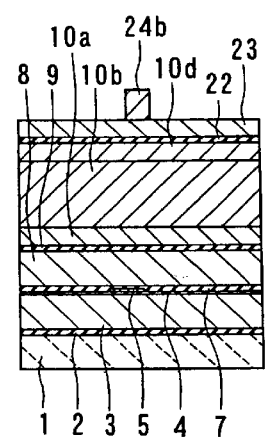
FIG. 14A  FIG. 14B

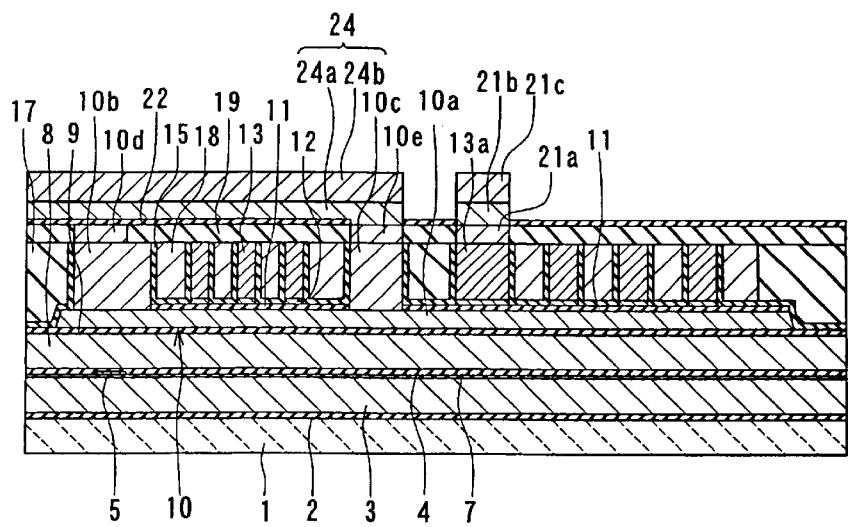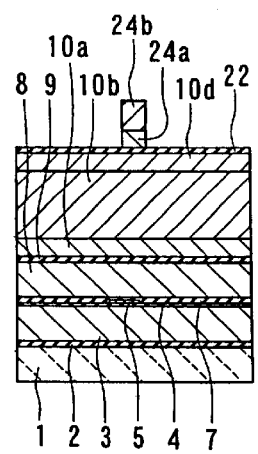
FIG. 15A  FIG. 15B
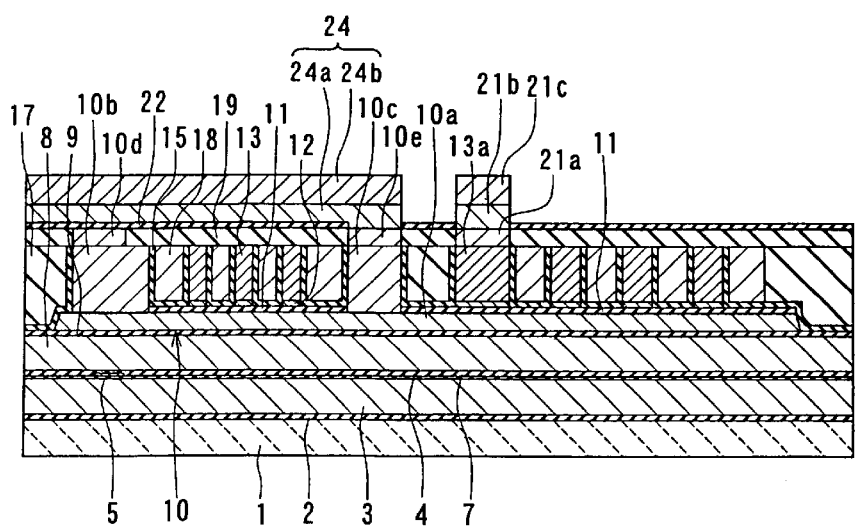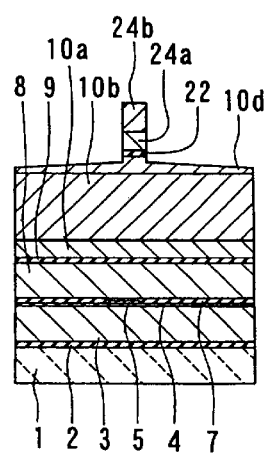
FIG. 16A  FIG. 16B

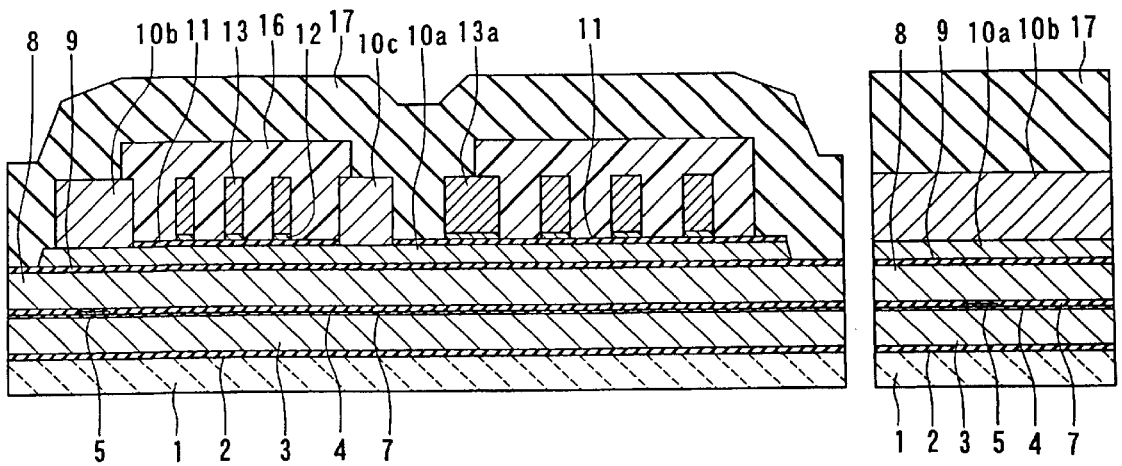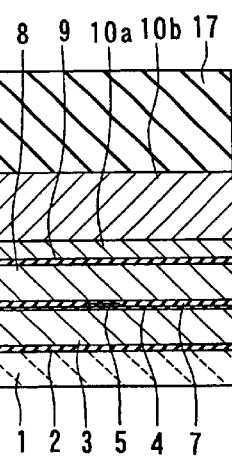
FIG. 19A    FIG. 19B
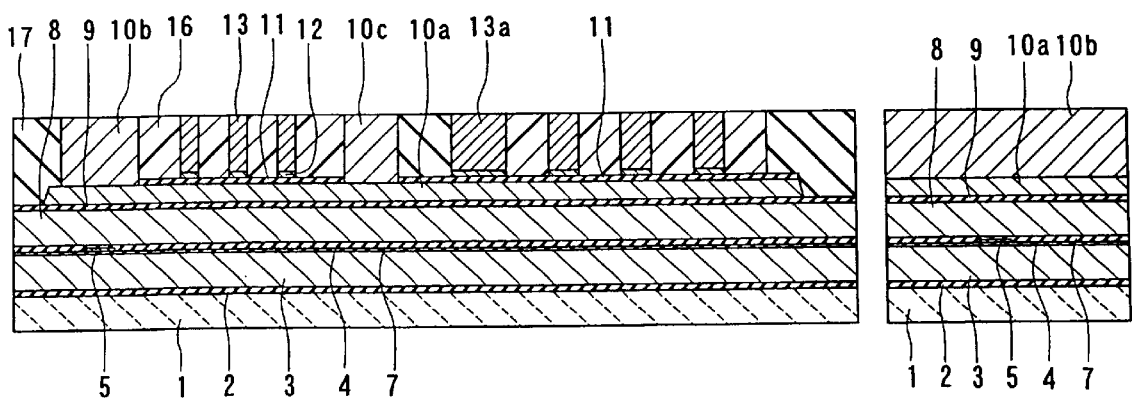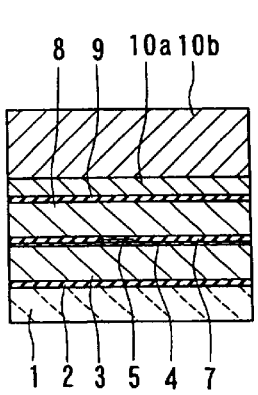
FIG. 20A    FIG. 20B

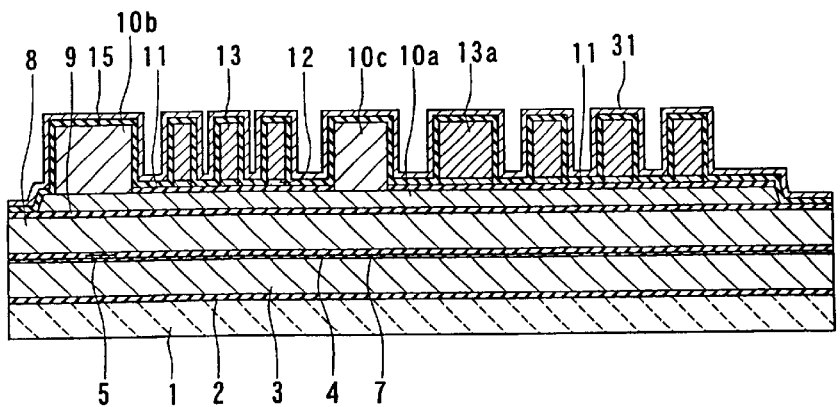
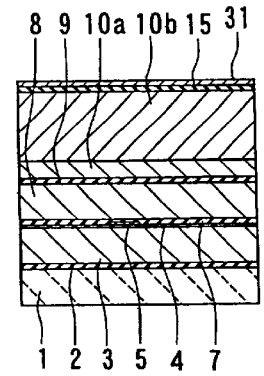
FIG. 27A
FIG. 27B
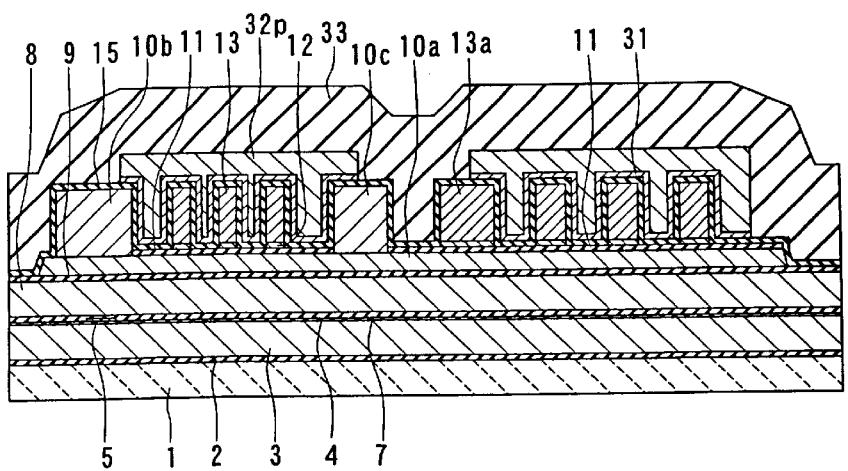
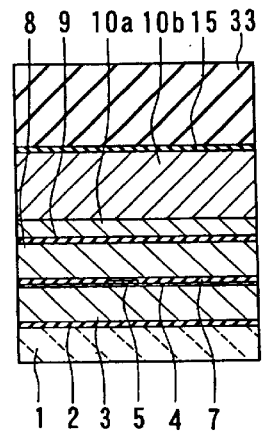
FIG. 28A
FIG. 28B

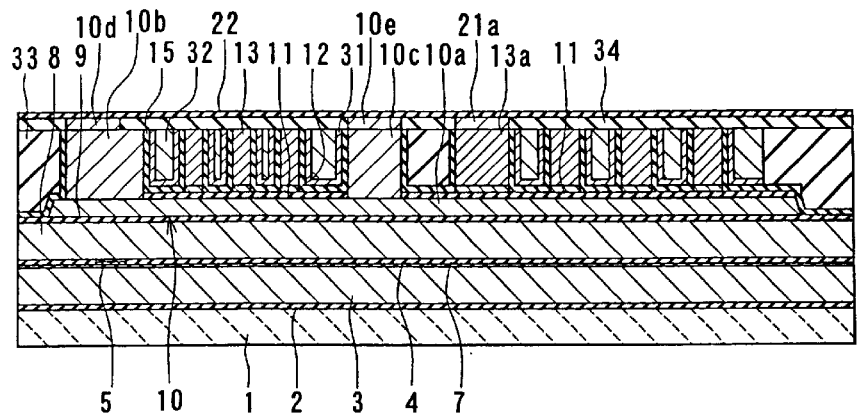
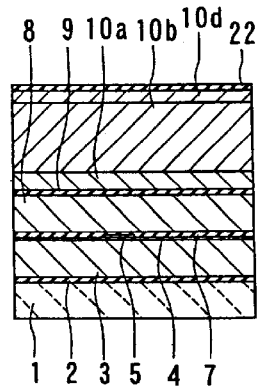
FIG. 31A
FIG. 31B
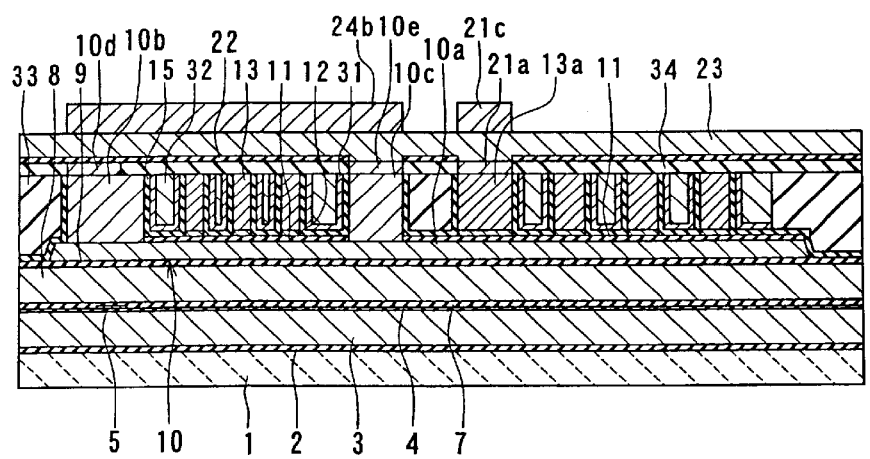
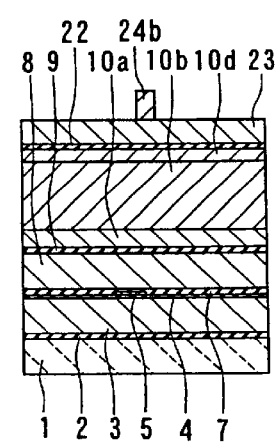
FIG. 32A
FIG. 32B

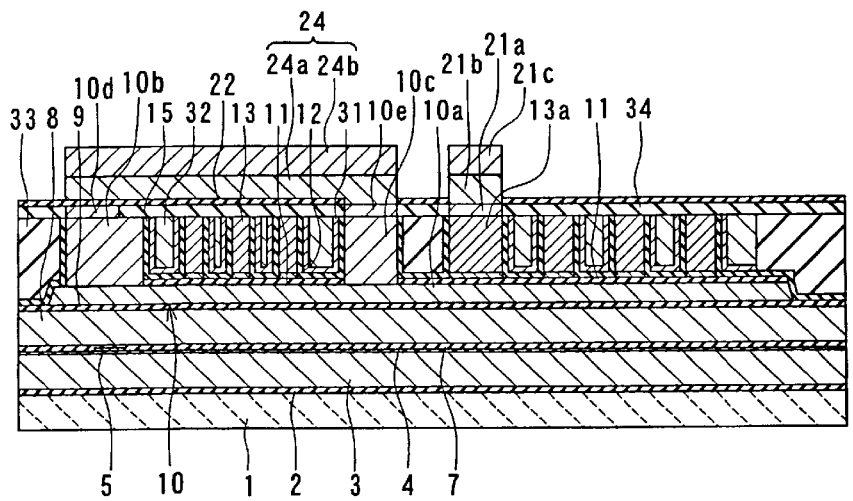
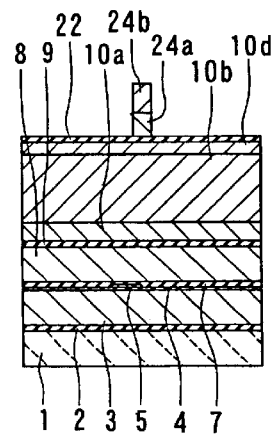
FIG. 33A            FIG. 33B
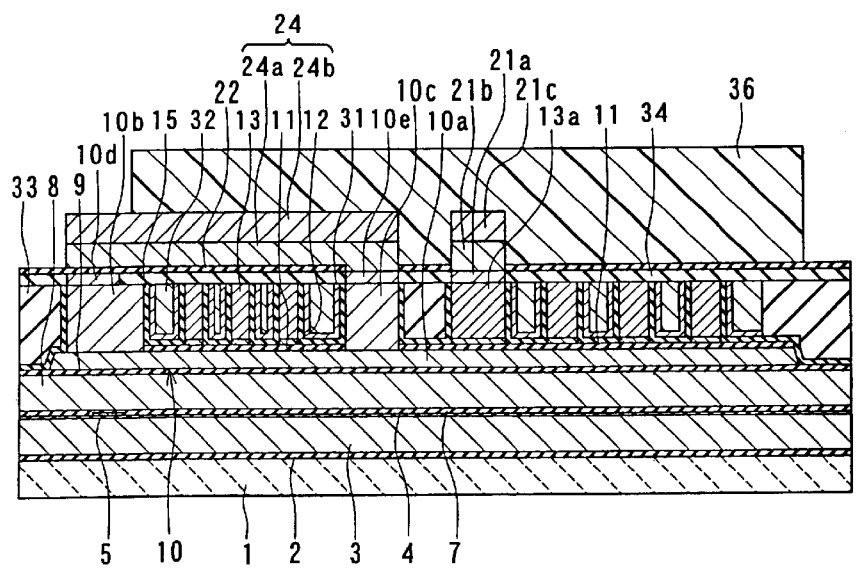
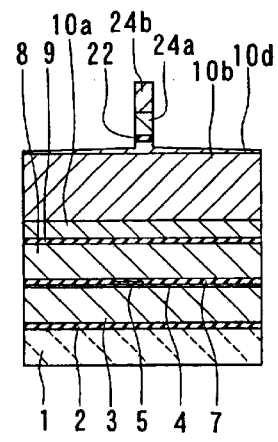
FIG. 34A            FIG. 34B

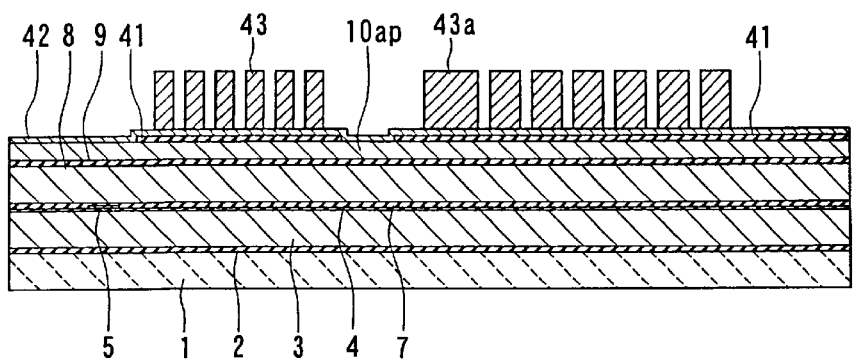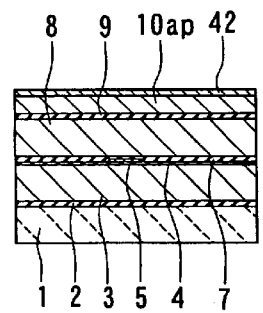
FIG. 37A    FIG. 37B
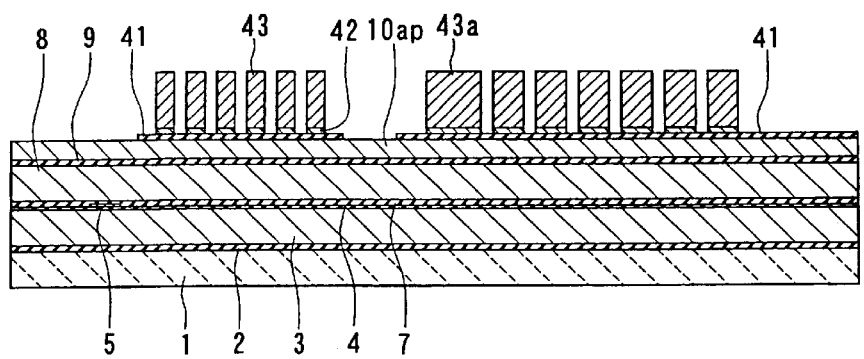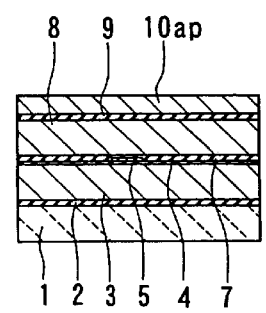
FIG. 38A    FIG. 38B

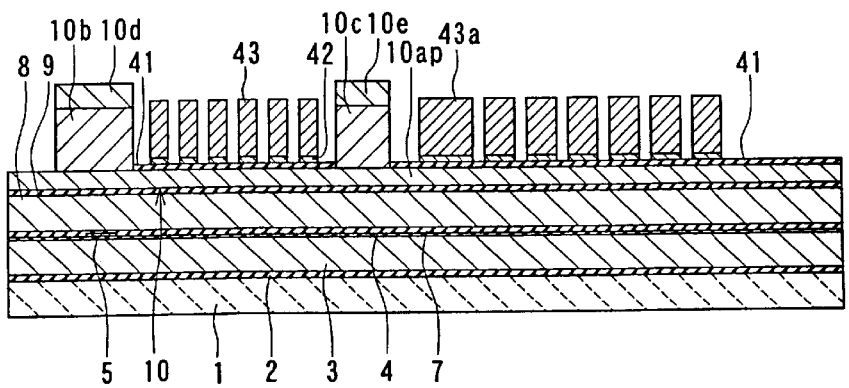 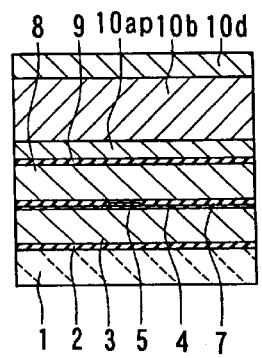
FIG. 39A  FIG. 39B
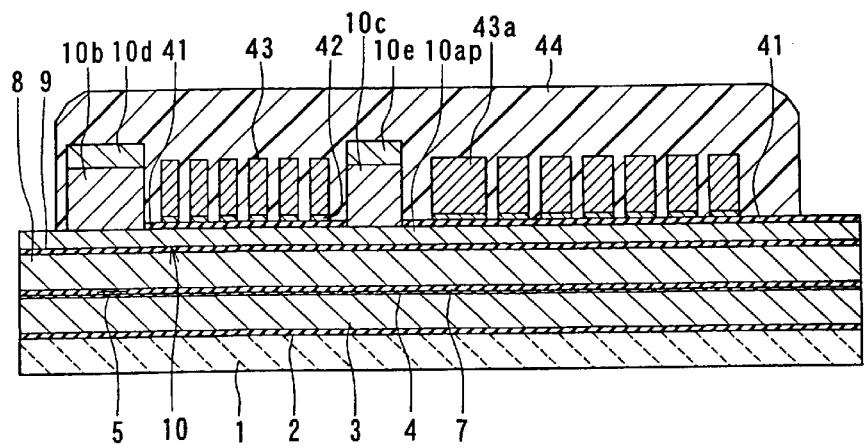 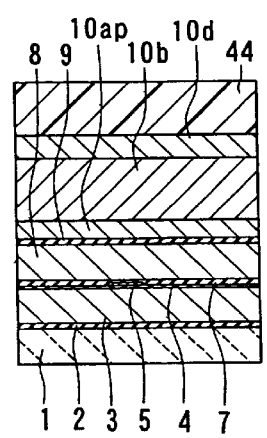
FIG. 40A  FIG. 40B

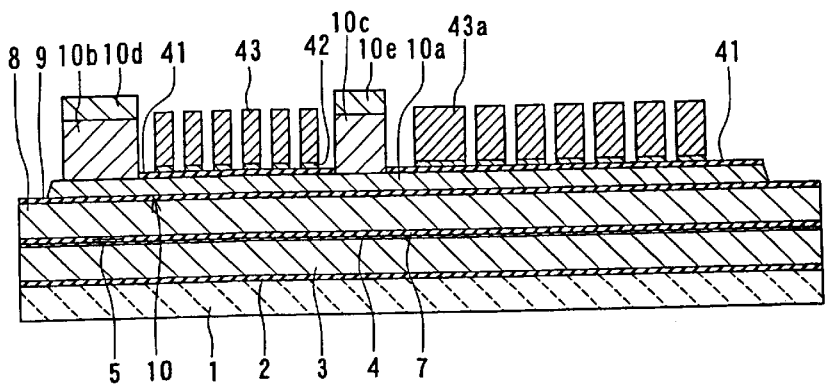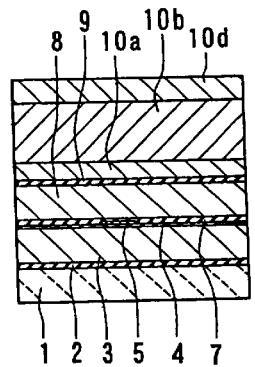
FIG. 41A         FIG. 41B
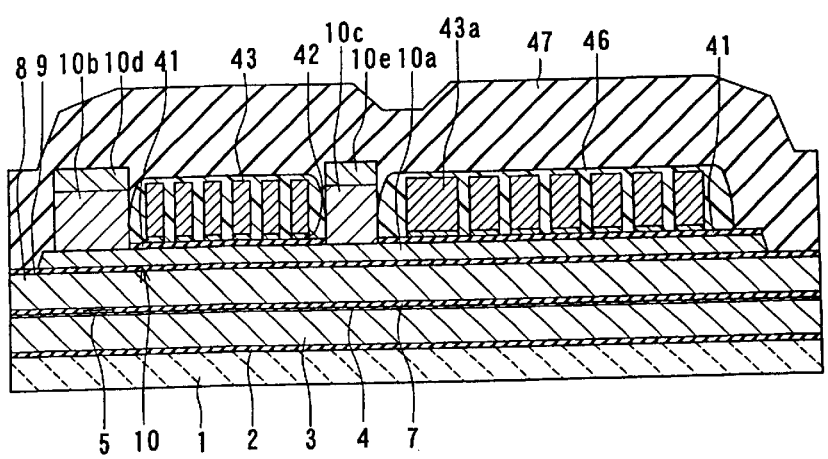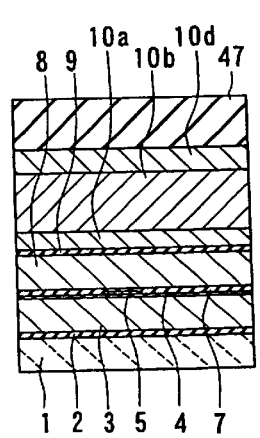
FIG. 42A         FIG. 42B

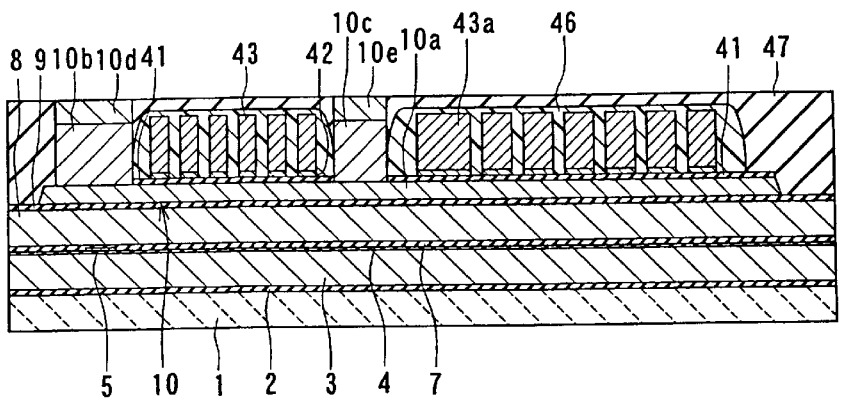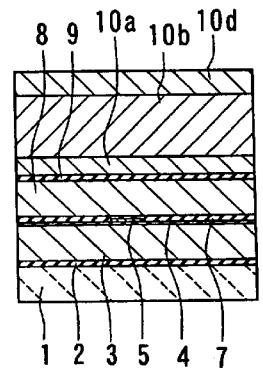
FIG. 43A  FIG. 43B
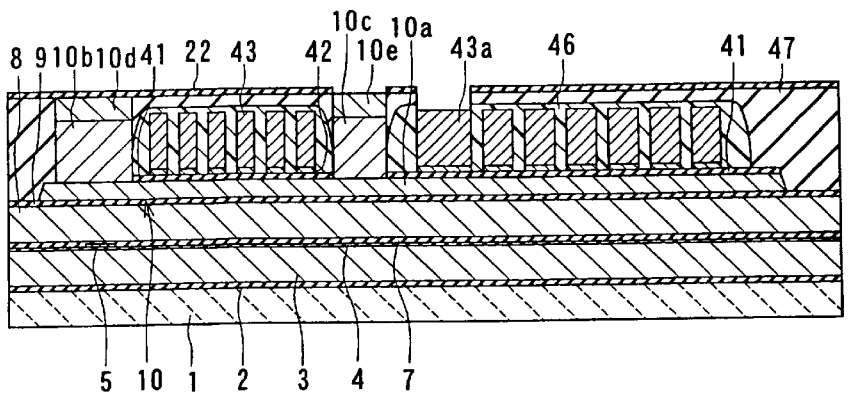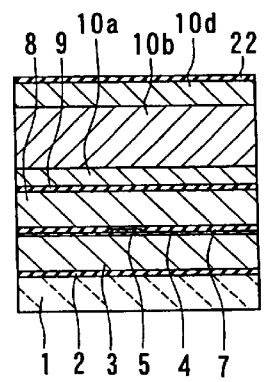
FIG. 44A  FIG. 44B

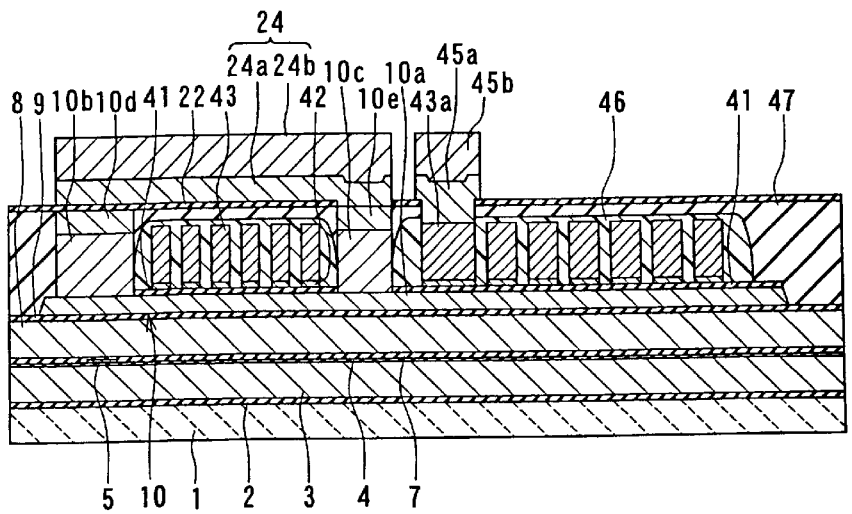
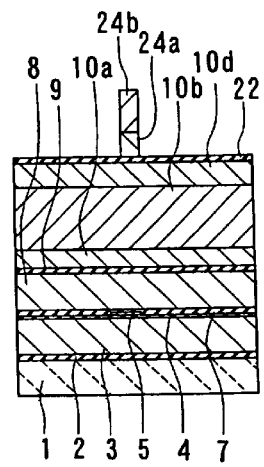
FIG. 47A
FIG. 47B
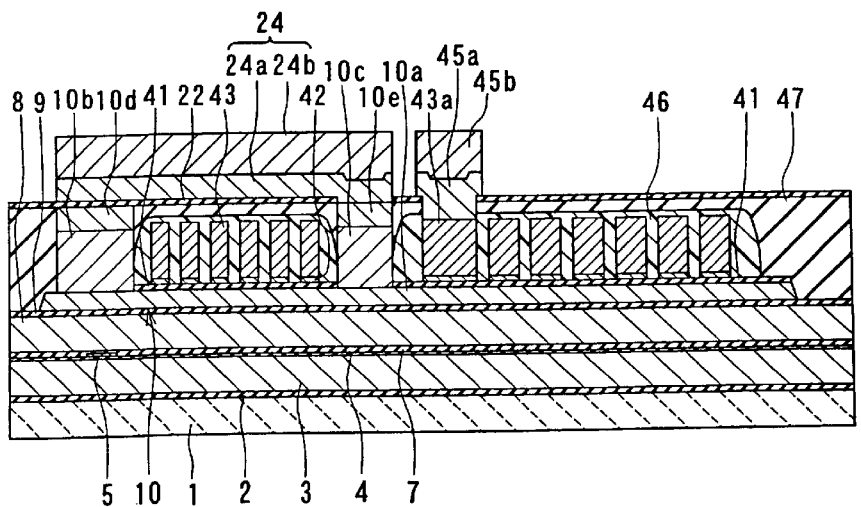
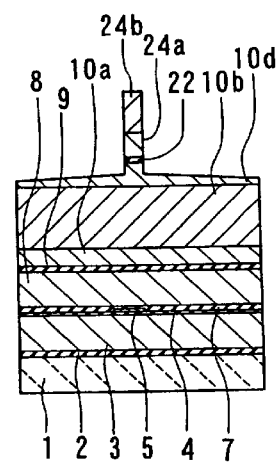
FIG. 48A
FIG. 48B

THIN-FILM MAGNETIC HEAD AND METHOD OF MANUFACTURING SAME

BACKGROUND OF THE INVENTION

1. Field of the Invention

The present invention relates to a method of manufacturing a thin-film magnetic head having at least an induction-type electromagnetic transducer.

2. Description of the Related Art

Performance improvements in thin-film magnetic heads have been sought as a real recording density of hard disk drives has increased. Among the thin-film magnetic heads, widely used are composite thin-film magnetic heads made of a layered structure including a recording head having an induction-type electromagnetic transducer for writing and a reproducing head having a magnetoresistive element (that may be hereinafter called an MR element) for reading.

In general, a recording head incorporates: a medium facing surface (air bearing surface) that faces toward a recording medium; a bottom pole layer and a top pole layer that are magnetically coupled to each other and include magnetic pole portions opposed to each other and located in regions of the pole layers on a side of the medium facing surface; a recording gap layer provided between the magnetic pole portions of the top and bottom pole layers; and a thin-film coil at least part of which is disposed between the top and bottom pole layers and insulated from the top and bottom pole layers.

Higher track densities on a recording medium are essential to enhancing the recording density among the performances of a recording head. To achieve this, it is required to implement a recording head of a narrow track structure in which the track width, that is, the width of the two magnetic pole portions opposed to each other on a side of the medium facing surface, with the recording gap layer disposed in between, is reduced down to microns or the order of submicron. Semiconductor process techniques are utilized to achieve such a structure.

With decreasing track width, it becomes harder to generate a high-density magnetic flux between the two magnetic pole portions that are opposed to each other with the recording gap layer in between. On that account, it is desirable that the magnetic pole portions be made of a magnetic material having a higher saturation flux density.

As the frequency of recording signals is made higher to increase the recording density, a higher speed of change of magnetic flux, or equivalently, a reduction in flux rise time, is required of recording heads. Furthermore, less degradation in the recording characteristics of the recording heads such as overwrite property and non-linear transition shift are required at higher frequency bands. To meet those requirements, it is desirable to reduce a yoke length. Decreasing the winding pitch of the thin-film coil is effective for reducing the yoke length.

One of known techniques for decreasing the winding pitch of a thin-film coil is to form a recess in the bottom pole layer so as to place the thin-film coil in the recess, as disclosed in U.S. Pat. No. 6,043,959 and Published Unexamined Japanese Patent Application (KOKAI) No. 2001-76316, for example.

According to the method of manufacturing a thin-film magnetic head described in U.S. Pat. No. 6,043,959, the bottom pole layer, the top pole layer, and the thin-film coil are formed through the following steps. Initially, the bottom pole layer patterned into a predetermined shape is formed. The recording gap layer and a magnetic layer are then formed on the bottom pole layer in succession. Part of the magnetic layer is coupled to the bottom pole layer. Then, a mask is formed to cover portions of the magnetic layer where to form the magnetic pole portion of the top pole layer and where to form a coupling portion of the top pole layer to be coupled to the bottom pole layer. The magnetic layer, the recording gap layer and the bottom pole layer are etched by using this mask. The magnetic layer thus etched makes a pole portion layer that is to be the magnetic pole portion of the top pole layer, and a coupling layer that is to be the coupling portion mentioned above. The above-mentioned etching also forms a trim structure, in which sidewalls of the magnetic pole portion of the top pole layer, the recording gap layer and at least part of the bottom pole layer are formed vertically in a self-aligned manner. The etching also provides the bottom pole layer with a recess in which the thin-film coil is to be placed. An insulating film is then formed all over, and thereafter, the thin-film coil is formed by plating on the insulating film inside the recess. Then, a thick insulating layer is formed all over and the top surface of this insulating layer is flattened to expose the pole portion layer and the coupling layer of the top pole layer. On the flattened surface, a yoke portion layer of the top pole layer is formed so that the pole portion layer and the coupling layer are coupled to each other.

According to the method of manufacturing a thin-film magnetic head described in Published Unexamined Japanese Patent Application (KOKAI) No. 2001-76316, the bottom pole layer, the top pole layer, and the thin-film coil are formed through the following steps. Initially, a first part of the bottom pole layer patterned into a predetermined shape is formed. Next, a second part to be the magnetic pole portion of the bottom pole layer and a third part to be coupled to the top pole layer are formed on the first part. The first, second and third parts makes up the bottom pole layer having a recess in which the thin-film coil is to be placed. An insulating film is then formed all over, and thereafter, the thin-film coil is formed by plating on the insulating film inside the recess. Then, a thick insulating layer is formed all over, and the top surface of this insulating layer is flattened to expose the second and third parts. The recording gap layer is formed on the flattened surface. In the recording gap layer, a contact hole is formed at a portion thereof located on the third part. Then, the top pole layer is formed on the recording gap layer. The top pole layer is connected to the third part through the contact hole. Using the magnetic pole portion of the top pole layer as a mask, the bottom pole layer and the recording gap layer are etched to form a trim structure.

In the methods of forming a thin-film magnetic head described in U.S. Pat. No. 6,043,959 and Published Unexamined Japanese Patent Application (KOKAI) No. 2001-76316, the bottom pole layer is first patterned to have a recess therein, and thereafter the thin-film coil is formed in the recess. The thin-film coil is formed by frame plating through the following steps. Initially, a photoresist frame is formed by photolithography. Then, a thin electrode film is formed to cover this frame. With an electric current passed through this electrode film, the thin-film coil is formed by electroplating. In the case of forming the thin-film coil by frame plating, a fine frame is required to attain a smaller winging pitch of the thin-film coil.

To form the thin-film coil in the recess of the bottom pole layer as described above, the frame must be formed on the uneven bottom pole layer. However, it is difficult to form a fine frame on such an uneven base by photolithography. The reason for this is that rays of light used for exposure of photolithography are reflected off the electrode film lying on the sidewalls of the recess. The photoresist is exposed to the reflected rays as well, which makes it difficult to form a fine frame with precision. Consequently, for example, if a thin-film coil having a line width of winding of 0.3 µm or less, or a winding pitch of 0.5 µm or less, and a height of 1.5 µm or more is to be formed in the recess of the bottom pole layer by the existing photolithography techniques, the yield of the thin-film coil becomes extremely low. Thus, it has been practically difficult to form such a coil.

OBJECT AND SUMMARY OF THE INVENTION

It is an object of the invention to provide a method of manufacturing a thin-film magnetic head which makes it possible to form a fine thin-film coil with high precision and consequently, to manufacture a thin-film magnetic head having a small yoke length and excellent recording characteristics at high frequency bands.

A first method of the invention is provided for manufacturing a thin-film magnetic head comprising: a medium facing surface that faces toward a recording medium; a first pole layer and a second pole layer that are magnetically coupled to each other and include magnetic pole portions opposed to each other and located in regions of the pole layers on a side of the medium facing surface; a gap layer provided between the magnetic pole portions of the first and second pole layers; and a thin-film coil at least part of which is disposed between the first and second pole layers and insulated from the first and second pole layers.

The first method of manufacturing the thin-film magnetic head comprises the steps of:

forming a magnetic layer to be used for forming the first pole layer, the magnetic layer having a wholly flat top surface:

forming the thin-film coil on the magnetic layer;

completing the first pole layer by at least either patterning the magnetic layer or forming another magnetic layer on the magnetic layer, after the thin-film coil is formed;

forming the gap layer on the magnetic pole portion of the first pole layer; and forming the second pole layer on the gap layer and the thin-film coil.

According to the first method of manufacturing the thin-film magnetic head of the invention, after forming the thin-film coil on the magnetic layer having a wholly flat surface, the first pole layer is completed by at least either patterning the magnetic layer or forming another magnetic layer on the magnetic layer. After that, in this manufacturing method, the gap layer and the second pole layer are formed.

A second method of the invention is provided for manufacturing a thin-film magnetic head comprising: a medium facing surface that faces toward a recording medium; a first pole layer and a second pole layer that are magnetically coupled to each other and include magnetic pole portions opposed to each other and located in regions of the pole layers on a side of the medium facing surface; a gap layer provided between the magnetic pole portions of the first and second pole layers; and a thin-film coil at least part of which is disposed between the first and second pole layers and insulated from the first and second pole layers, wherein: the first pole layer includes a first layer disposed to face toward the thin-film coil, and a second layer disposed closer to the medium facing surface than the thin-film coil and connected to a surface of the first layer that is closer to the gap layer.

The second method of manufacturing the thin-film magnetic head comprises the steps of:

forming a magnetic layer that is to be the first layer and has a wholly flat top surface;

forming the thin-film coil on the magnetic layer;

forming the second layer on the magnetic layer after the thin-film coil is formed;

forming the gap layer on the second layer; and forming the second pole layer on the gap layer and the thin-film coil.

According to the second method of manufacturing the thin-film magnetic head of the invention, the thin-film coil is formed on the magnetic layer that is to be the first layer of the first pole layer and has a wholly flat surface. Then, the second layer of the first pole layer is formed on the magnetic layer. After that, in this manufacturing method, the gap layer and the second pole layer are formed.

The second method of manufacturing the thin-film magnetic head of the invention may further comprise the step of completing the first layer by patterning the magnetic layer after the second layer is formed. In this case, in the step of forming the thin-film coil, an insulating film may be formed on the magnetic layer in a region in which the thin-film coil is to be formed; then an electrode film for electroplating may be formed to cover the magnetic layer and the insulating film; and then electroplating may be performed using the electrode film to thereby form the thin-film coil. Furthermore, in the step of forming the second layer, a portion of the electrode film other than a portion thereof underlying the thin-film coil may be removed before forming the second layer on the magnetic layer.

In the second method of manufacturing the thin-film magnetic head of the invention, the second pole layer may be a flat layer.

A third method of the invention is provided for manufacturing a thin-film magnetic head comprising: a medium facing surface that faces toward a recording medium; a first pole layer and a second pole layer that are magnetically coupled to each other and include magnetic pole portions opposed to each other and located in regions of the pole layers on a side of the medium facing surface; a gap layer provided between the magnetic pole portions of the first and second pole layers; and first and second thin-film coils at least part of each of which is disposed between the first and second pole layers and insulated from the first and second pole layers, wherein the first pole layer includes a first layer disposed to face toward the first and second thin-film coils, and a second layer disposed closer to the medium facing surface than the first and second thin-film coils and connected to a surface of the first layer that is closer to the gap layer.

The third method of manufacturing the thin-film magnetic head of the invention comprises the steps of:

forming a magnetic layer that is to be the first layer and has a wholly flat top surface;

forming the first thin-film coil on the magnetic layer;

forming the second layer on the magnetic layer after the first thin-film coil is formed;

completing the first layer by patterning the magnetic layer after the second layer is formed;

forming the second thin-film coil so that at least part of the second thin-film coil is disposed in a space between turns of the first thin-film coil;

forming the gap layer on the second layer; and forming the second pole layer on the gap layer, the first thin-film coil and the second thin-film coil.

According to the third method of manufacturing the thin-film magnetic head of the invention, the first thin-film coil is formed on the magnetic layer that is to be the first layer of the first pole layer and has a wholly flat top surface, and then, the second layer is formed on the magnetic layer. After that, the magnetic layer is patterned to complete the first layer. Then, in this manufacturing method, the second thin-film coil is formed so that at least part thereof is disposed in a space between turns of the first thin-film coil, followed by formation of the gap layer and the second pole layer.

In the third method of manufacturing the thin-film magnetic head of the invention, in the step of forming the first thin-film coil, an insulating film for the first thin-film coil may formed on the magnetic layer in a region in which the first thin-film coil is to be formed; then, an electrode film for the first thin-film coil may be formed to cover the magnetic layer and the insulating film for the first thin-film coil; and then electroplating may be performed using the electrode film for the first thin-film coil to thereby form the first thin-film coil. Furthermore, in the step of forming the second layer, a portion of the electrode film for the first thin-film coil other than a portion thereof underlying the first thin-film coil may be removed before forming the second layer on the magnetic layer.

In the third method of manufacturing the thin-film magnetic head of the invention, in the step of completing the first layer, a mask layer may be formed to cover the first thin-film coil and the second layer, and then a portion of the magnetic layer that is not covered with the mask layer may be removed by etching, to thereby complete the first layer.

In the third method of manufacturing the thin-film magnetic head of the invention, the step of forming the second thin-film coil may include the steps of:

forming an inter-coil insulating film to cover the first thin-film coil;

forming a first insulating layer to fill the space between the turns of the first thin-film coil;

forming a second insulating layer to cover the inter-coil insulating film and the first insulating layer;

polishing the second insulating layer so that the first insulating layer is exposed and top surfaces of the first and second insulating layers are flattened;

removing the first insulating layer from the space between the turns of the first thin-film coil; and forming the second thin-film coil so that at least part of the second thin-film coil is disposed in the space between the turns of the first thin-film.

In the third method of manufacturing the thin-film magnetic head of the invention, the step of forming the second thin-film coil may include the steps of:

forming a first insulating layer to fill the space between the turns of the first thin-film coil;

forming a second insulating layer to cover the first insulating layer;

polishing the second insulating layer so that the first insulating layer is exposed and top surfaces of the first and second insulating layers are flattened;

removing the first insulating layer from the space between the turns of the first thin-film coil;

forming an inter-coil insulating film to cover the first thin-film coil; and forming the second thin-film coil so that at least part of the second thin-film coil is disposed in the space between the turns of the first thin-film coil.

In the third method of manufacturing the thin-film magnetic head of the invention, the step of forming the second thin-film coil may include the steps of:

forming an inter-coil insulating film to cover the first thin-film coil;

forming an electrode film for the second thin-film coil to cover the inter-coil insulating film; and forming the second thin-film coil by electroplating using the electrode film for the second thin-film coil so that at least part of the second thin-film coil is disposed in the space between the turns of the first thin-film coil.

In the third method of manufacturing the thin-film magnetic head of the invention, the first pole layer may further include a third layer, one of surfaces of the third layer being connected to a surface of the second layer closer to the gap layer, and the other one of the surfaces of the third layer being adjacent to the gap layer, and the method may further comprise the step of forming the third layer after the second thin-film coil is formed. In this case, in the step of forming the third layer, top surfaces of the first and second thin-film coils may be flattened; then, a coil coat insulating film may be formed to cover the top surfaces of the first and second thin-film coils; then, the third layer may be formed on the second layer; and then top surfaces of the third layer and the coil coat insulating film may be flattened.

In the third method of manufacturing the thin-film magnetic head of the invention, the second pole layer may be a flat layer.

Other and further objects, features and advantages of the invention will appear more fully from the following description.

BRIEF DESCRIPTION OF THE DRAWINGS

FIGS. 1A and 1B are cross sections for illustrating a step in a method of manufacturing a thin-film magnetic head according to a first embodiment of the invention.

FIGS. 2A and 2B are cross sections for illustrating a step that follows FIGS. 1A and 1B.

FIGS. 5A and 5B are cross sections for illustrating a step that follows FIGS. 4A and 4B.

FIGS. 6A and 6B are cross sections for illustrating a step that follows FIGS. 5A and 5B.

FIGS. 7A and 7B are cross sections for illustrating a step that follows FIGS. 6A and 6B.

FIGS. 8A and 8B are cross sections for illustrating a step that follows FIGS. 7A and 7B.

FIGS. 11A and 11B are cross sections for illustrating a step that follows FIGS. 10A and 10B.

FIGS. 12A and 12B are cross sections for illustrating a step that follows FIGS. 11A and 11B.

FIGS. 13A and 13B are cross sections for illustrating a step that follows FIGS. 12A and 12B.

FIGS. 14A and 14B are cross sections for illustrating a step that follows FIGS. 13A and 13B.

FIGS. 15A and 15B are cross sections for illustrating a step that follows FIGS. 14A and 14B.

FIGS. 16A and 16B are cross sections for illustrating a step that follows FIGS. 15A and 15B.

FIGS. 19A and 19B are cross sections for illustrating a step in a modified example of the method of manufacturing the thin-film magnetic head according to the first embodiment of the invention.

FIGS. 20A and 20B are cross sections for illustrating a step that follows FIGS. 19A and 19B.

FIGS. 27A and 27B are cross sections for illustrating a step in a method of manufacturing a thin-film magnetic head according to a second embodiment of the invention.

FIGS. 28A and 28B are cross sections for illustrating a step that follows FIGS. 27A and 27B.

FIGS. 31A and 31B are cross sections for illustrating a step that follows FIGS. 30A and 30B.

FIGS. 32A and 32B are cross sections for illustrating a step that follows FIGS. 31A and 31B.

FIGS. 33A and 33B are cross sections for illustrating a step that follows FIGS. 32A and 32B.

FIGS. 34A and 34B are cross sections for illustrating a step that follows FIGS. 33A and 33B.

FIG. 37A and FIG. 37B are cross sections for illustrating a step in a method of manufacturing a thin-film magnetic head according to a third embodiment of the invention.

FIGS. 38A and 38B are cross sections for illustrating a step that follows FIGS. 37A and 37B.

FIGS. 39A and 39B are cross sections for illustrating a step that follows FIGS. 38A and 38B.

FIGS. 40A and 40B are cross sections for illustrating a step that follows FIGS. 39A and 39B.

FIGS. 41A and 41B are cross sections for illustrating a step that follows FIGS. 40A and 40B.

FIGS. 42A and 42B are cross sections for illustrating a step that follows FIGS. 41A and 41B.

FIGS. 43A and 43B are cross sections for illustrating a step that follows FIGS. 42A and 42B.

FIGS. 44A and 44B are cross sections for illustrating a step that follows FIGS. 43A and 43B.

FIGS. 47A and 47B are cross sections for illustrating a step that follows FIGS. 46A and 46B.

FIGS. 48A and 48B are cross sections for illustrating a step that follows FIGS. 47A and 47B.

DETAILED DESCRIPTION OF THE PREFERRED EMBODIMENTS

Figures 3A, 3B:
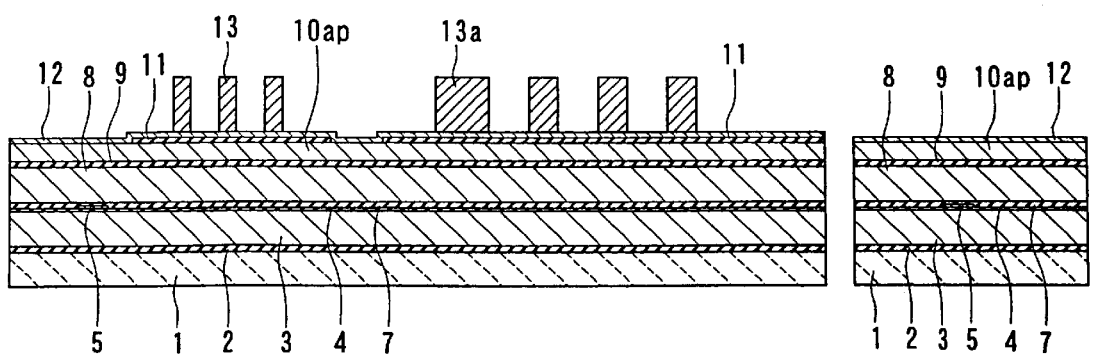
FIGS. 3A and 3B are cross sections for illustrating a step that follows FIGS. 2A and 2B.

Preferred embodiments of the invention will now be described in detail with reference to the accompanying drawings.

[First Embodiment]

Reference is now made to FIGS. 1A to 17A and FIGS. 1B to 17B to describe a method of manufacturing a thin-film magnetic head according to a first embodiment of the invention. FIGS. 1A to 17A are cross sections each orthogonal to the air bearing surface and the top surface of the substrate. FIGS. 1B to 17B are cross sections of magnetic pole portions each parallel to the air bearing surface.

In the method of manufacturing the thin-film magnetic head of the embodiment, as shown in FIGS. 1A and 1B, an insulating layer 2 made of alumina ($Al_2O_3$), for example, is first deposited to a thickness of approximately 1 to 3 $\mu$m on a substrate 1 made of aluminum oxide and titanium carbide ($Al_2O_3$—TiC), for example. On the insulating layer 2, a bottom shield layer 3 of a magnetic material such as Permalloy is formed to a thickness of approximately 2 to 3 $\mu$m for making a reproducing head. The bottom shield layer 3 is selectively formed on the insulating layer 2 by plating using a photoresist film as a mask, for example. Then, although not shown, an insulating layer of alumina, for example, is formed over the entire surface to a thickness of 3 to 4 $\mu$m, for example. The insulating layer is then polished through chemical mechanical polishing (hereinafter referred to as CMP), for example, to expose the bottom shield layer 3, and the surface is thereby flattened.

On the bottom shield layer 31 a bottom shield gap film 4 serving as an insulating film is formed to a thickness of about 20 to 40 nm, for example. On the bottom shield gap film 4, an MR element 5 for magnetic signal detection is formed to a thickness of tens of nanometers. The MR element 5 may be formed by selectively etching an MR film formed by sputtering. The MR element 5 is disposed near a region where an air bearing surface to be described later is formed. The MR element 5 may be an element utilizing a magnetosensitive film that exhibits magnetoresistivity, such as an AMR element, a GMR element or a TMR (tunnel magnetoresistive) element. Then, although not shown, a pair of electrode layers to be electrically connected to the MR element 5 are formed to a thickness of tens of nanometers on the bottom shield gap film 4. Then, a top shield gap film 7 serving as an insulating film is formed to a thickness of about 20 to 40 nm, for example, on the bottom shield gap film 4 and the MR element 5. The MR element 5 is embedded in the shield gap films 4 and 7. Examples of insulating materials to be used for the shield gap films 4 and 7 include alumina, aluminum nitride, and diamond-like carbon (DLC). The shield gap films 4 and 7 may be formed by sputtering or chemical vapor deposition (hereinafter referred to as CVD).

On the top shield gap film 7, a top shield layer 8 of a magnetic material is selectively formed to a thickness of approximately 1.0 to 1.5 $\mu$m for the reproducing head. Then, although not shown, an insulating layer made of alumina, for example, is formed over the entire surface to a thickness of 2 to 3 $\mu$m, for example. The insulating layer is polished by CMP, for example, so that the top shield layer 8 is exposed and the surface is flattened.

Then, an insulating layer 9 made of alumina, for example, is formed to a thickness of approximately 0.15 to 0.3 $\mu$m on the entire top surface of the laminate obtained through the foregoing steps. On the entire top surface of the insulating layer 9, a magnetic layer 10ap of a magnetic material is formed to a thickness of approximately 0.5 to 1.0 $\mu$m. The magnetic layer 10ap has a wholly flat top surface. The magnetic layer 10ap is used to form a first layer 10a of a bottom pole layer 10 to be described later. The bottom pole layer 10 includes the first layer 10a, and a second layer 10b, a third layer 10d, and coupling layers 10c and 10e to be described later.

The magnetic layer 10ap may be formed of a material such as NiFe (Ni: 80 weight %; Fe: 20 weight %), or NiFe (Ni: 45 weight %; Fe: 55 weight %), CoNiFe (Co: 10%, Ni: 20%, Fe: 70%) or FeCo (Fe: 67%, Co: 33%) that is a high saturation flux density material, by means of plating. Alternatively, the magnetic layer 10ap may be formed of FeCoN, FeAlN, FeN, FeCo, FeZrN or the like that is a high saturation flux density material, by means of sputtering. Here, by way of example, the magnetic layer 10a lp shall be formed of FeCoN to have a thickness of 0.5 $\mu$m by sputtering.

Next, as shown in FIGS. 2A and 2B, an insulating film 11 for a first thin-film coil, made of alumina, for example, is formed to a thickness of 0.2 $\mu$m on the magnetic layer 10ap. Then, although not shown, a photoresist film is formed on the insulating film 11 in a region where to form a first thin-film coil 13 to be described later. Using the photoresist film as a mask, the insulating film 11 is selectively etched so that a portion of the insulating film 11 remains in the region where to form the first thin-film coil 13.

Next, an electrode film 12 for the first thin-film coil, made of a conductive material, is formed by sputtering, for example, so as to cover the magnetic layer loop and the insulating film 11. The electrode film 12 functions as an electrode and a seed layer for plating. The electrode film 12 is made up of, for example, a 5-nm-thick Ti layer, and a 50-nm-thick Cu layer formed thereon. To attain closer contact between the magnetic layer 10ap or the insulating film 11 and the first thin-film coil 13, a layer of a high-melting metal such as Ta and W may be formed, instead of the above-mentioned Ti layer, on the magnetic layer 10ap and the insulating film 11.

Then, although not shown, a frame to be used for forming the first thin-film coil 13 by frame plating is formed on the electrode film 12 by photolithography.

Then, as shown in FIGS. 3A and 3B, electroplating is performed using the electrode film 12, to form the first thin-film coil 13 of Cu, for example, to a thickness of approximately 2.0 to 2.7 am. The first thin-film coil 13 is disposed within the region where the insulating film 11 lies. In FIG. 3A, the reference numeral 13a represents a connecting portion of the first thin-film coil 13 that is to be connected to a second thin-film coil 18 described later.

Figures 4A, 4B:
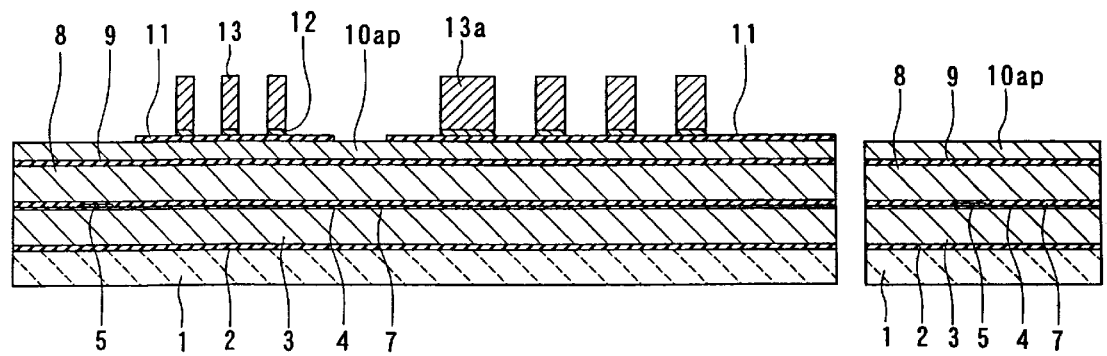
FIGS. 4A and 4B are cross sections for illustrating a step that follows FIGS. 3A and 3B.

Then, as shown in FIGS. 4A and 4B, a portion of the electrode film 12 other than that underlying the first thin-film coil 13 is removed by ion beam etching (ion milling), for example.

Then, although not shown, a frame to be used to form the second layer lob and the coupling layer 10c of the bottom pole layer by frame plating is formed on the magnetic layer 10ap and the insulating film 11 by photolithography.

Then, as shown in FIGS. 5A and 5B, electroplating is performed to form the second layer lob and the coupling layer 10c, each being made of a magnetic material, on the magnetic layer 10ap to a thickness of, e.g., 3 $\mu$m each. In this embodiment, to form the second layer 10b and the coupling layer 10c by plating, no special electrode film is used but the magnetic layer 10ap unpatterned is used as an electrode and a seed layer for the plating. The second layer 10b and the coupling layer 10c are each made up of, for example, a CoNiFe layer formed by plating, or a laminate of a CoNiFe layer and a CoFe layer successively formed by plating.

The second layer 10b is disposed near a region in which an air bearing surface described later is to be formed. The coupling layer 10c is a portion for connecting the first layer 10a and a top pole layer to be described later to each other, and is disposed near the center of the first thin-film coil 13.

In this embodiment, a part of the first thin-film coil 13 located farther from the air bearing surface than the coupling layer 10c is greater in the line width of the winding and the winding pitch than a part located closer to the air bearing surface than the coupling layer 10c. This makes it possible to attain a smaller yoke length and to reduce the total resistance value of the first thin-film coil 13.

For example, in the region between the second layer 10b and the coupling layer 10c, the first thin-film coil 13 has a line width of the winding of 0.2-0.35 $\mu$m, and a winding pitch of 0.35-0.65 $\mu$m. In the region located farther from the air bearing surface than the coupling layer 10c, the first thin-film coil 13 has a line width of the winding of 0.4-0.6 $\mu$m, and a winding pitch of 0.55-0.9 $\mu$m.

Next, as shown in FIGS. 6A and 6B, a photoresist layer 14 is formed to cover the first thin-film coil 13, the second layer 10b and the coupling layer 10c. Using the photoresist layer 14 as a mask, the magnetic layer 10ap is selectively etched by ion beam etching, for example. The magnetic layer 10ap is thus patterned to complete the first layer 10a.

As shown in FIGS. 7A and 7B, after removing the photoresist layer 14, an inter-coil insulating film 15 made of alumina, for example, is formed by CVD, for example, to a thickness of 0.08 to 0.2 μm so as to cover the entire top surface of the laminate.

Then, as shown in FIGS. 8A and 8B, a first insulating layer 16 made of photoresist, for example, is formed to a thickness of 4 to 5 μm in a region in which the second thin-film coil 18 described later is to be formed. The first insulating layer 16 is formed to fill at least a space between turns of the first thin-film coil 13. Part of the first insulating layer 16 is disposed outside the outer periphery of the first thin-film coil 13 and inside the inner periphery of the same. Then, a second insulating layer 17 made of alumina, for example, is formed to a thickness of 3 to 4 μm so as to cover the inter-coil insulating film 15 and the first insulating layer 16.

Figures 9A, 9B:
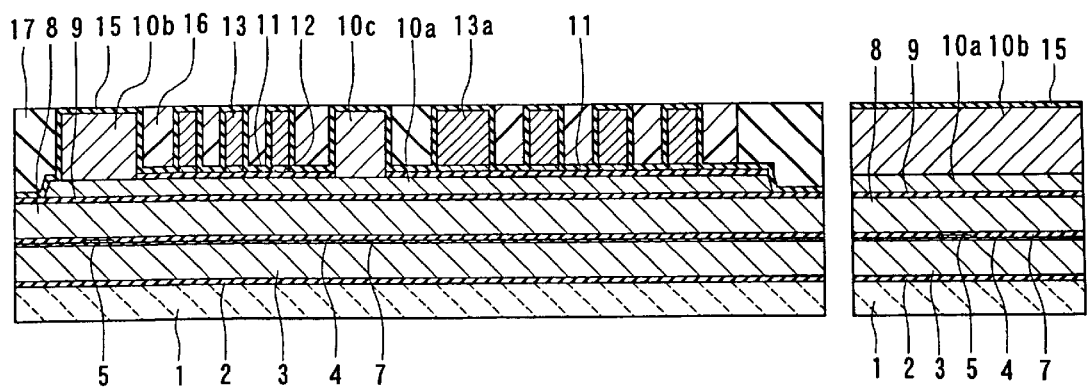
FIGS. 9A and 9B are cross sections for illustrating a step that follows FIGS. 8A and 8B.

As shown in FIGS. 9A and 9B, the first insulating layer 16 and the second insulating layer 17 are polished by CMP, for example, so that the first insulating layer 16 is exposed and the top surfaces of the first and second insulating layers 16 and 17 are flattened. At this time, a portion of the insulating film 15 located on the first thin-film coil 13 may be removed, or left unremoved as shown in FIG. 9A. In this embodiment, before forming the first insulating layer 16, the inter-coil insulating film 15 is formed to cover the first thin-film coil 13. As a result, the insulating film 15 reinforces the first thin-film coil 13, and it is thereby possible to prevent the first thin-film coil 13 from collapsing during the polishing of the first and second insulating layers 16 and 17.

Figures 10A, 10B:
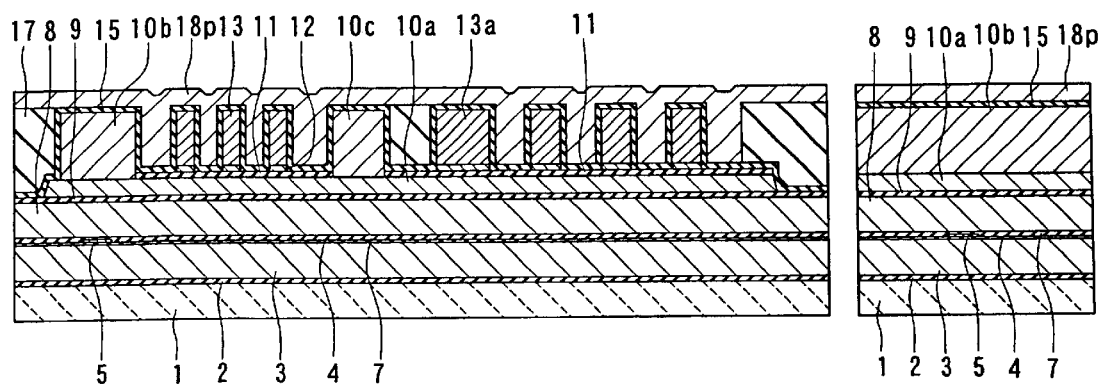
FIGS. 10A and 10B are cross sections for illustrating a step that follows FIGS. 9A and 9B.

As shown in FIGS. 10A and 10B, after removing the first insulating layer 16, a conductive layer made of Cu, for example, is formed to a thickness of 1.0 μm by CVD, for example, so as to cover the entire top surface of the laminate. Here, the 1.0-μm-thick conductive layer can fill a space between turns of a portion of the first thin-film coil 13 located closer to the air bearing surface than the coupling layer 10c. However, the 1.0-μm-thick conductive layer cannot fill a space between turns of a portion of the first thin-film coil 13 located farther from the air bearing surface than the coupling layer 10c, because of the greater winding pitch of the coil. Hence, in this embodiment, a conductive layer having a thickness of 2.0 μm, for example, is formed by plating on the above-mentioned 1.0-μm-thick conductive layer. The 1.0-μm-thick conductive layer and the 2.0-μm-thick conductive layer mentioned above will now be collectively referred to as a conductive layer 18p for the second thin-film coil. The conductive layer 18p for the second thin-film coil is m disposed in at least a space between the turns of the first thin-film coil 13. Part of the conductive layer 18p for the second thin-film coil is located outside the outer periphery of the first thin-film coil 13 and inside the inner periphery of the same.

As shown in FIGS. 11A and 11B, the second thin-film coil 18 is formed by damascening. Specifically, the top surface of the conductive layer 18p for the second thin-film coil is polished by CMP so that the first layer 10b, the coupling layer 10c and the first thin-film coil 13 are exposed. As a result, the conductive layer 18p remaining in such a groove as the space between the turns of the first thin-film coil 13 makes the second thin-film coil 18. The polishing mentioned above is performed so that the first thin-film coil 13 and the second thin-film coil 18 each have a thickness of no smaller than 1.5 μm or no smaller than 2.0 μm, for example. Although not shown, the second thin-film coil 18 has a connecting portion to be connected to the connecting portion 13a of the first thin-film coil 13.

As shown in FIGS. 12A and 12B, a coil coat insulating film 19 made of alumina, for example, is formed to a thickness of 0.5 to 0.7 μm to cover the entire top surface of the laminate. Then, the coil coat insulating film 19 is selectively etched to remove portions thereof corresponding to the second layer 10b, the coupling layer 10c, the connecting portion 13a of the first thin-film coil 13, and the connecting portion of the second thin-film coil 18. This etching is effected by reactive ion etching (hereinafter referred to as RIE) with a chlorine-base gas such as $Cl_2$ or $BCl_3$, using a photoresist film as a mask. The coil coat insulating film 19 after the etching covers the top surfaces of the thin-film coils 13 and 18 except the connecting portion 13a of the first thin-film coil 13 and the connecting portion of the second thin-film coil 18.

Then, a magnetic layer 20 of a magnetic material is formed to a thickness of 0.5 to 1.0 μm so as to cover the entire top surface of the laminate. The magnetic layer 20 may be formed of NiFe (Ni: 45 weight %; Fe: 55 weight %), CoNiFe (Co: 10%, Ni: 20%, Fe: 70%) or FeCo (Fe: 67%, Co: 33%) that is a high saturation flux density material, by means of plating. Alternatively, the magnetic layer 20 may be formed of FeCoN, FeAlN, FeN, FeCo, FeZrN or the like that is a high saturation flux density material, by means of sputtering. Here, by way of example, the magnetic layer 20 shall be formed of FeCoN by sputtering.

Then, as shown in FIGS. 13A and 13B, the magnetic layer 20 is polished by CMP, for example, so that the coil coat insulating film 19 is exposed, and the top surfaces of the coil coat insulating film 19 and the magnetic layer 20 are thereby flattened. This polishing is performed so that the magnetic layer 20 finally has a thickness of 0.3 to 0.6 μm. The magnetic layer 20 remaining after the polishing makes a third layer 10d of the bottom pole layer on the second layer 10b, the coupling layer 10e on the coupling layer 10c, a connecting layer 21a on the connecting portion 13a of the first thin-film coil 13, and a not-shown connecting layer on the not-shown connecting portion of the second thin-film coil 18. The end of the third layer 10d located farther from the air bearing surface defines the throat height of the recording head. The throat height is the length (height) of the magnetic pole portions, that is, the portions of the two pole layers opposed to each other with the recording gap layer in between, as taken from the air-bearing-surface-side end to the other end.

Then, a recording gap layer 22 of an insulating material such as alumina is formed to a thickness of 0.06 to 0.1 μm so as to cover the entire top surface of the laminate.

Then, as shown in FIGS. 14A and 14B, a magnetic layer 23 of a magnetic material is formed to a thickness of 0.5 to 1.2 μm so as to cover the entire top surface of the laminate. The magnetic layer 23 may be formed of NiFe (Ni: 45 weight %; Fe: 55 weight %), CoNiFe (Co: 10%, Ni: 20%, Fe: 70%) or FeCo (Fe: 67%, Co: 33%) that is a high saturation flux density material, by means of plating. Alternatively, the magnetic layer 23 may be formed of FeCoN, FeAlN, FeN, FeCo, FeZrN or the like that is a high saturation flux density material, by means of sputtering. Here, by way of example, the magnetic layer 23 shall be formed of FeCoN by sputtering.

On the magnetic layer 23, a second layer 24b of a top pole layer 24 to be described later and a connecting layer 21c are each formed to a thickness of 1.0 to 2.0 μm by frame plating, for example. The second layer 24b and the connecting layer 21c are each made of a magnetic material such as NiFe. The second layer 24b extends from a position corresponding to the third layer 10d to a position corresponding to the coupling layer 10e of the bottom pole layer 10. The connecting layer 21c extends from a position corresponding to the connecting portion 13a of the first thin-film coil 13 to a position corresponding to the not-shown connecting portion of the second thin-film coil 18.

Then, as shown in FIGS. 15A and 15B, the magnetic layer 23 is selectively etched using the second layer 24b and the connecting layer 21c as masks. The magnetic layer 23 remaining after the etching makes a first layer 24a of the top pole layer 24 and a connecting layer 24b.

The top pole layer 24 is made up of the first layer 24a and the second layer 24b. The top pole layer 24 includes: a track width defining portion having one end located in the medium facing surface and the other end located away from the medium facing surface; and a yoke portion coupled to the other end of the track width defining portion. The yoke portion has a width equal to that of the track width defining portion at the interface with the track width defining portion. The width of the yoke portion gradually increases from this interface with an increase in distance from the track width defining portion, and finally becomes constant. The track width defining portion is the magnetic pole portion of the top pole layer 24.

The connecting layers 24b and 21c connect the connecting portion 13a of the first thin-film coil 13 and the connecting portion of the second thin-film coil 18 to each other.

The etching of the magnetic layer 23 is effected by RIE using a chlorine-base gas such as $Cl_2$, $BCl_3$, and $Cl_2+BCl_3$, or a mixture of this chlorine-base gas and $O_2$, $N_2$, $H_2$, HCl, Ar, or He. The etching temperature falls within the range of 50 to 300° C. inclusive. Here, by way of example, the etching temperature shall be 250° C.

Then, as shown in FIGS. 16A and 16B, the recording gap layer 22 is etched by RIE with a chlorine-base gas such as $Cl_2$ and $BCl_3$, using the top pole layer 24 as a mask. Then, using the track width defining portion of the top pole layer 24 as a mask, the third layer 10d of the bottom pole layer 10 is partially etched around the track width defining portion by ion beam etching, for example. A trim structure as shown in FIG. 16B is thereby formed. The trim structure suppresses an increase in the effective track width due to expansion of a magnetic flux generated during writing in a narrow track. A portion of the third layer 10d that is opposed to the track width defining portion of the top pole layer 24 with the recording gap layer 22 in between is the magnetic pole portion of the bottom pole layer 10.

Figures 17A, 17B:
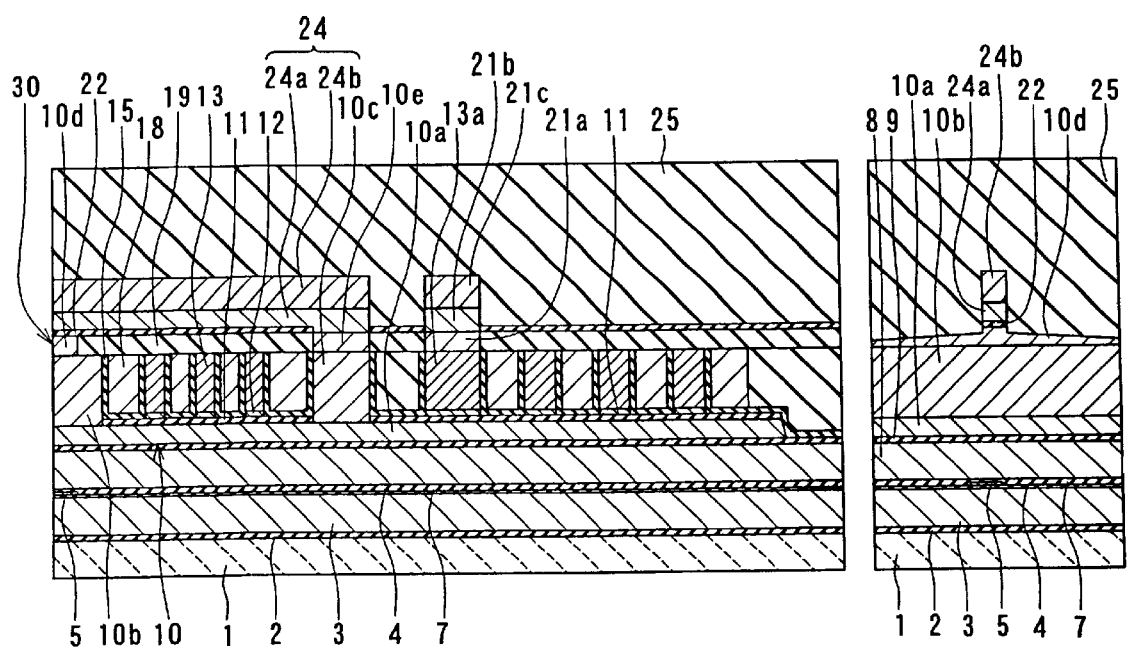
FIGS. 17A and 17B are cross sections for illustrating a step that follows FIGS. 16A and 16B.
Figure 18:
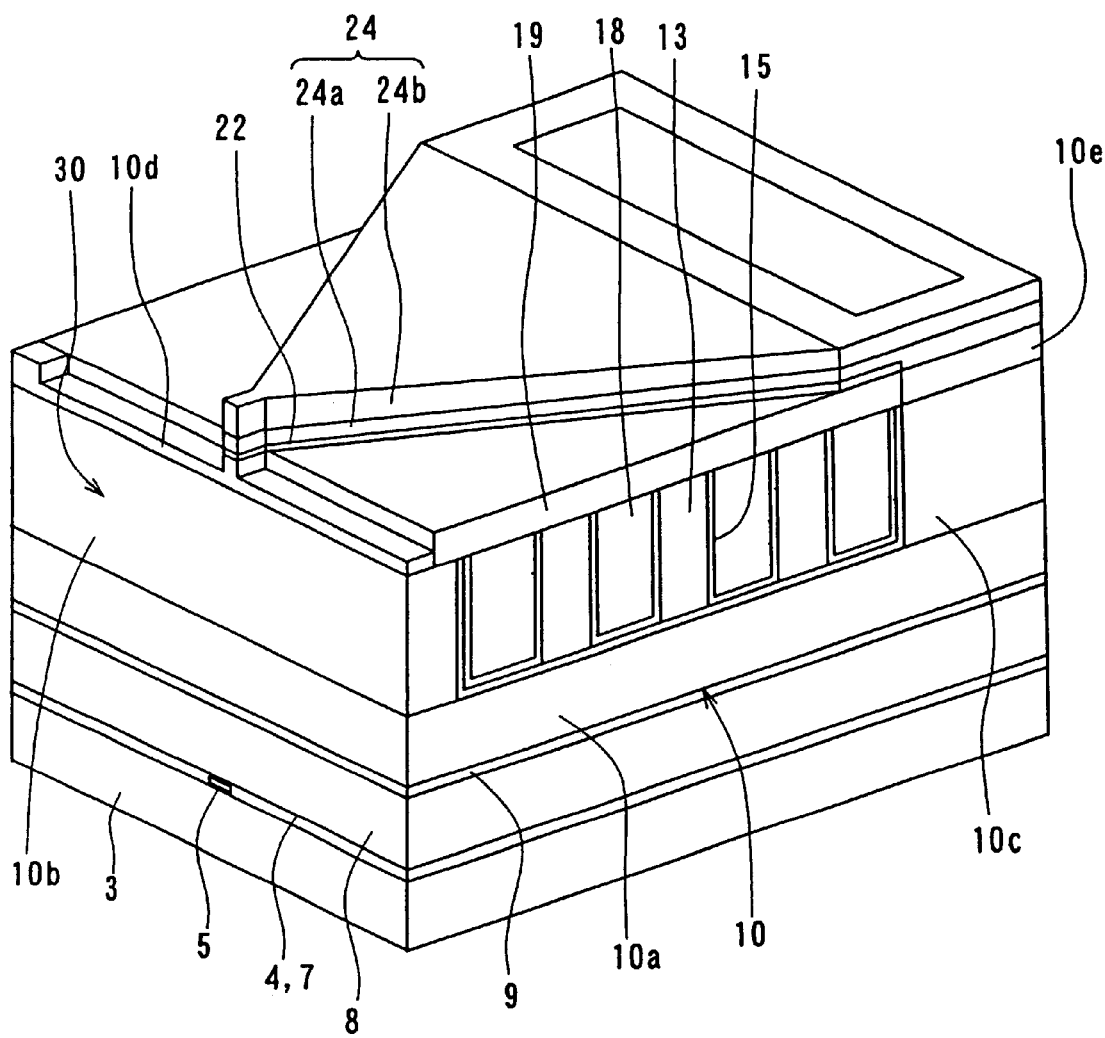
FIG. 18 is a perspective view showing the thin-film magnetic head in the first embodiment of the invention.

Then, as shown in FIGS. 17A and 17B, an overcoat layer 25 made of alumina, for example, is formed to a thickness of 20 to 40 $\mu$m so as to cover the entire top surface of the laminate. Its surface is flattened, and not-shown electrode pads are formed thereon. Finally, lapping of the slider including the foregoing layers is performed to form the air bearing surface 30 of the recording head and the reproducing head, thereby completing the thin-film magnetic head. FIG. 18 is a perspective view of the thin-film magnetic head excluding the overcoat layer 25.

The bottom pole layer 10 and the top pole layer 24 of this embodiment correspond to the first pole layer and the second pole layer of the invention, respectively.

Reference is now made to FIGS. 19A to 23A and FIGS. 19B to 23B to describe a modified example of the method of manufacturing the thin-film magnetic head of this embodiment. FIGS. 19A to 23A are cross sections each orthogonal to the air bearing surface and the top surface of the substrate. FIGS. 19B to 23B are cross sections of the magnetic pole portions each parallel to the air bearing surface.

Up to the step of patterning the magnetic layer 10ap to complete the first layer 10a, the manufacturing method of this modified example has the same steps as the foregoing ones described with reference to FIGS. 1A to 6A and FIGS. 1B to 6B.

Then, in this example, as shown in FIGS. 19A and 19B, the photoresist layer 14 is removed and a first insulating layer 16 made of photoresist, for example, is formed to a thickness of 4 to 5 $\mu$m in a region in which the second thin-film coil 18 is to be formed. The first insulating layer 16 is formed to fill at least the space between the turns of the first thin-film coil 13. Part of the first insulating layer 16 is disposed outside the outer periphery of the first thin-film coil 13 and inside the inner periphery of the same. Then, a second insulating layer 17 made of alumina, for example, is formed to a thickness of 3 to 4 $\mu$m so as to cover the first insulating layer 16.

Then, as shown in FIGS. 20A and 20B, the first insulating layer 16 and the second insulating layer 17 are polished by CMP, for example, so that the second layer 10b, the coupling layer 10c, the first thin-film coil 13 and the first insulating layer 16 are exposed and the top surfaces of these elements and the top surface of the second insulating layer 17 are flattened.

Figures 21A, 21B:
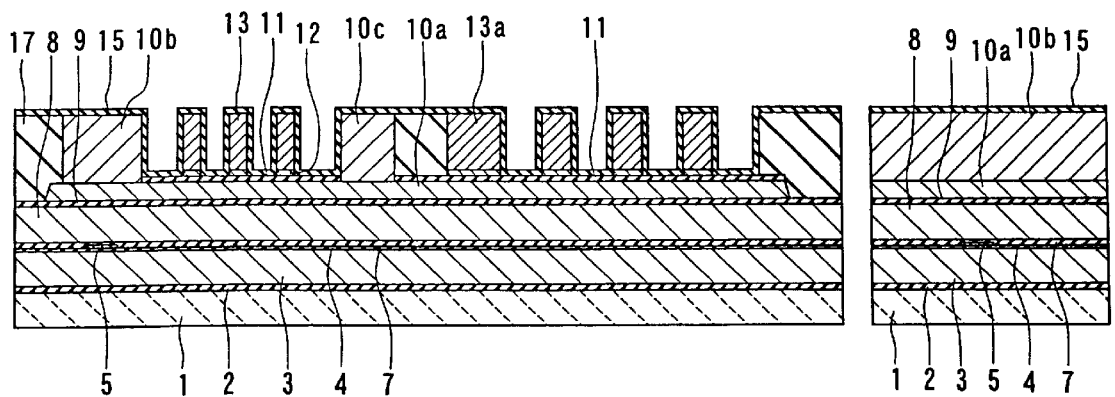
FIGS. 21A and 21B are cross sections for A illustrating a step that follows FIGS. 20A and 20B.

Then, as shown in FIGS. 21A and 21B, after removing the first insulating layer 16, an inter-coil insulating film 15 made of alumina, for example, is formed to a thickness of 0.08 to 0.2 $\mu$m by CVD, for example, so as to cover the entire top surface of the laminate.

Figures 22A, 22B:
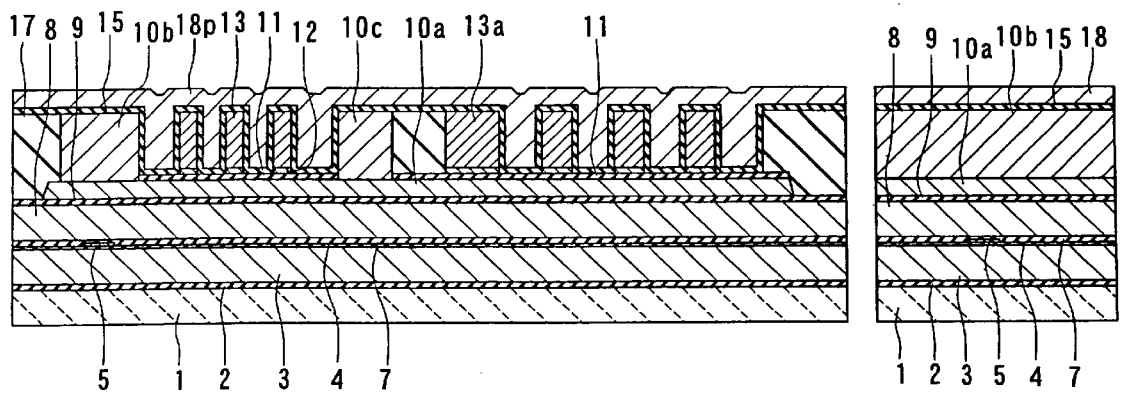
FIGS. 22A and 22B are cross sections for illustrating a step that follows FIGS. 21A and 21B.

Then, as shown in FIGS. 22A and 22B, a conductive layer made of Cu, for example, is formed to a thickness of 1.0 $\mu$m by CVD, for example, so as to cover the entire top surface of the laminate. On the 1.0-$\mu$m-thick conductive layer, another conductive layer having a thickness of 2.0 $\mu$m, for example, is formed by plating. The 1.0-$\mu$m-thick conductive layer and the 2.0-$\mu$m-thick conductive layer mentioned above will be collectively referred to as the conductive layer 18p for the second thin-film coil. The conductive layer 18p for the second thin-film coil is disposed in at least the space between the turns of the first thin-film coil 13. Part of the conductive layer 18p for the second thin-film coil is disposed outside the outer periphery of the first thin-film coil 13 and inside the inner periphery of the same.

Figures 23A, 23B:
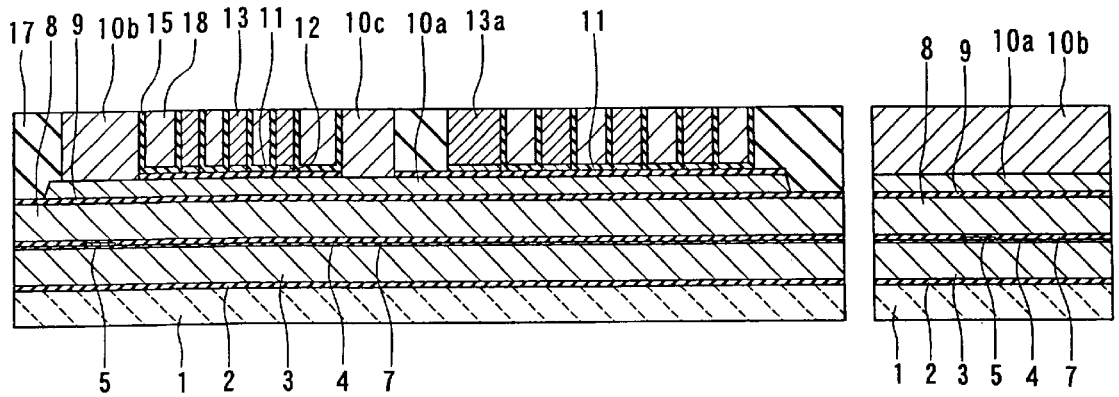
FIGS. 23A and 23B are cross sections for illustrating a step that follows FIGS. 22A and 22B.

Then, as shown in FIGS. 23A and 23B, the second thin-film coil 18 is formed by damascening. Specifically, the top surface of the conductive layer 18p for the second thin-film coil is polished by CMP so that the first layer 10b, the coupling layer 10c, and the first thin-film coil 13 are exposed. As a result, the conductive layer 18p remaining in such a groove as the space between the turns of the first thin-film coil 13 makes the second thin-film coil 18. The polishing mentioned above is performed so that the first thin-film coil 13 and the second thin-film coil 18 each have a thickness of no smaller than 1.5 $\mu$m or no smaller than 2.0 $\mu$m, for example. Although not shown, the second thin-film coil 18 has a connecting portion to be connected to the connecting portion 13a of the first thin-film coil 13.

The subsequent steps in the manufacturing method of this modified example are the same as the ones described with reference to FIGS. 12A to 17A and FIGS. 12B to 17B.

A thin-film magnetic head manufactured by the manufacturing method of this embodiment, including the modified example, comprises: the air bearing surface 30 as a medium facing surface that faces toward a recording medium; the bottom pole layer 10 and the top pole layer 24 that are magnetically coupled to each other and include the magnetic pole portions that are opposed to each other and located in regions of those pole layers on a side of the air bearing surface 30; the recording gap layer 22 provided between the magnetic pole portion of the bottom pole layer 10 and the magnetic pole portion of the top pole layer 24; and the thin-film coils 13 and 18, at least part of each of which is disposed between the bottom pole layer 10 and the top pole layer 24 and insulated from those pole layers.

The bottom pole layer 10 includes: the first layer 10a disposed to face toward the thin-film coils 13 and 18; the second layer 10b disposed closer to the air bearing surface 30 than the thin-film coils 13 and 18 and connected to the surface of the first layer 10a that is closer to the recording gap layer 22; and the third layer 10d, one of surfaces of the third layer 10d being connected to the surface of the second layer 10b that is closer to the recording gap layer 22, and the other one of the surfaces of the third layer 10d being adjacent to the recording gap layer 22.

The top pole layer 24 is made up of the first layer 24a and the second layer 24b that are both flat.

In the method of manufacturing the thin-film magnetic head of this embodiment, the first thin-film coil 13 is formed on the magnetic layer 10ap that is to be the first layer 10a of the bottom pole layer 10 and has a wholly flat top surface. The second layer 10b of the bottom pole layer 10 is then formed on the magnetic layer 10ap. Then, in this embodiment, after the formation of the second layer 10b, the magnetic layer 10ap is patterned to complete the first layer 10a. Furthermore, in this embodiment, the second thin-film coil 18 is formed so that at least part thereof is disposed in the space between the turns of the first thin-film coil 13.

According to the embodiment, as stated above, it is possible to form the first thin-film coil 13 finely with high precision because the coil 13 is formed on the magnetic layer 10ap whose top surface is wholly flat. The embodiment also makes it possible to form the second thin-film coil 18 finely with high precision because the coil 18 is formed so that at least part thereof is disposed in the space between the turns of the first thin-film coil 13. According to the embodiment, the winding of the first thin-film coil 13 and the winding of the second thin-film coil 18 are separated from each other by the thin inter-coil insulating film 15. This allows an extremely small spacing between the winding of the first thin-film coil 13 and that of the second thin-film coil 18. Consequently, this embodiment makes it possible to significantly reduce the winding pitch of each of the thin-film coils 13 and 18. For example, according to the embodiment, the winding pitch of each of the thin-film coils 13 and 18 can be reduced to 0.5 $\mu$m or less, or 0.3 $\mu$m or less, for example, in the region between the second layer 10b and the coupling layer 10c. As a result, according to the embodiment, it is possible to make the yoke length 5 $\mu$m or less, or 3 $\mu$m or less, for example. In the embodiment, the yoke length is expressed in terms of distance between the second layer 10b and the coupling layer 10c of the bottom pole layer 10.

As has been described, according to the embodiment, it is possible to manufacture a thin-film magnetic head having a small yoke length and excellent recording characteristics such as overwrite property and nonlinear transition shift at high frequency bands.

It should be noted that, in the case where a special electrode film is provided to form the second layer 10b and the coupling layer 10c of the bottom pole layer 10 by plating, this electrode film may get into the space between the turns of the first thin-film coil 13 and cause a short circuit in the space between the turns of the first thin-film coil 13. This necessitates some kind of prevention measures. On the contrary, in the present embodiment, the second layer 10b and the coupling layer 10c are formed by plating without any special electrode film, but using the unpatterned magnetic layer 10ap as an electrode and a seed layer for the plating. Consequently, the embodiment facilitates formation of the second layer 10b and the coupling layer 10c without causing such a problem as mentioned above.

According to prior art, to form the bottom pole layer by plating, a plating film is formed by frame plating and unwanted portion of the plating film is etched away to complete the bottom pole layer and to stabilize the composition thereof. This process necessitates both a photolithographic mask for forming the frame and a photolithographic mask for forming the etching mask. In contrast, according to the embodiment, the first layer 10a of the bottom pole layer 10 is not patterned in advance but the magnetic layer 10ap that is to be the first layer 10a is formed on the entire top surface of the laminate by plating or sputtering. Then, after the first thin-film coil 13, the second layer 10b and the coupling layer 10c are formed on the magnetic layer 10ap, the magnetic layer 10ap is patterned by etching to complete the first layer 10a. Thus, according to the embodiment, it is possible to stabilize the composition of the first layer 10a while reducing the number of photolithographic masks necessary to form the first layer 10a.

In the embodiment, if a high saturation flux density material is used as materials for the second and third layers 10b and 10d of the bottom pole layer 10 and the top pole layer 24, saturation of a magnetic flux halfway through the magnetic path is prevented. As a result, it is possible to utilize the magnetomotive force generated by the thin-film coils 13 and 18 efficiently for recording.

Incidentally, for example, U.S. Pat. No. 6,043,959 discloses a thin-film magnetic head in which the top pole layer includes a pole portion layer of a small width and a yoke portion layer of a great width that is connected to the top surface of the pole portion layer. In such a thin-film magnetic head, the following problems arise when the recording track width is small, in particular. Specifically, in this kind of thin-film magnetic head, the cross-sectional area of the magnetic path abruptly decreases in the portion connecting the pole portion layer to the yoke portion layer. As a result, a magnetic flux may be saturated in this portion, which can hamper sufficient transmission of the magnetic flux from the yoke portion layer to the pole portion layer. Hence, the thin-film magnetic head may deteriorate in overwrite property.

Besides, the foregoing thin-film magnetic head in which the top pole layer includes the pole portion layer and the yoke portion layer, a magnetic flux leaks from the yoke portion layer toward the recording medium and, as a result, so-called side write may be caused by yoke portion layer that is great in width. That is, the yoke portion layer may write data in a region of the recording medium where data is not supposed to be written. In this case, the effective track width may become greater than a desired track width. In addition, since the positional relationship between the pole portion layer and the yoke portion layer is determined by alignment in photolithography, the actual positional relationship between the two layers may be off a desired relationship. This can make the occurrences of side write more striking.

In contrast, according to this embodiment, no magnetic flux saturation occurs in the portion connecting the pole portion layer to the yoke portion layer because the top pole layer 24 that defines a track width is a flat layer. Consequently, according to the embodiment, there will occur none of such problems as mentioned above, that is, deterioration in overwrite property and side write that can be caused by the yoke portion layer.

In the embodiment, the flat top pole layer 24 is formed on a flat base. Therefore, according to the embodiment, the track width defining portion of the top pole layer 24 can be formed finely with high precision. As a result, it becomes possible to achieve, for example, a track width of 0.2 $\mu$m or less which has been heretofore difficult in the case of mass-producing thin-film magnetic heads.

Figure 24:
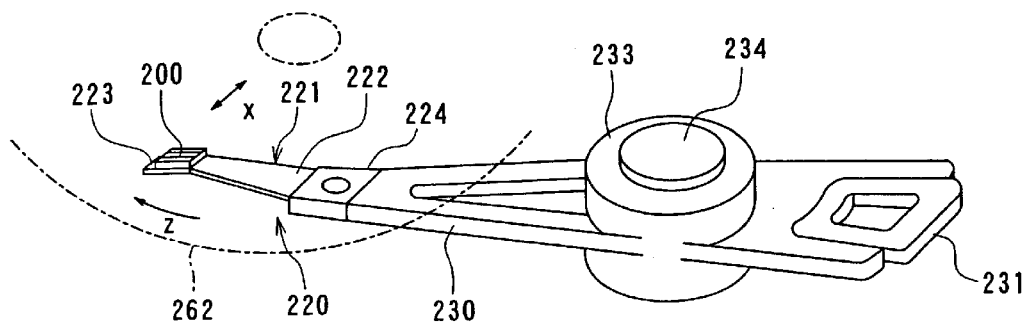
FIG. 24 is a perspective view of a head gimbal assembly incorporating a slider that includes the thin-film magnetic head in the first embodiment of the invention.
Figure 25:
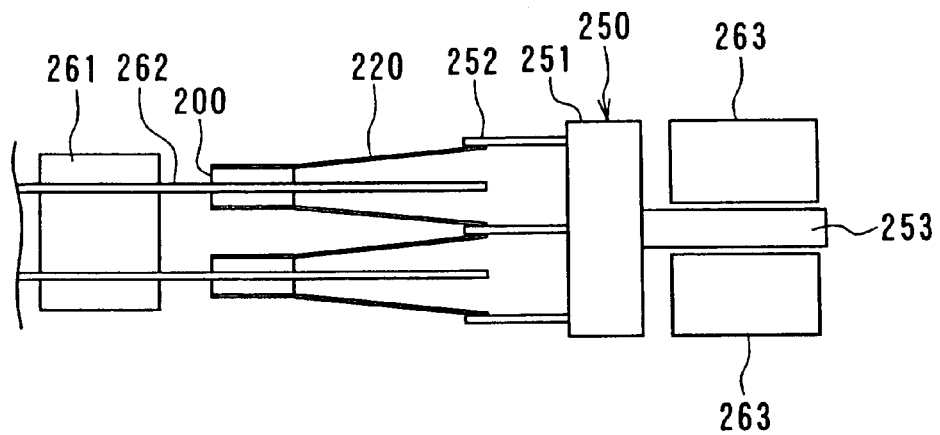
FIG. 25 is an explanatory view showing the main part of a hard disk drive incorporating the thin-film magnetic head in the first embodiment of the invention.
Figure 26:
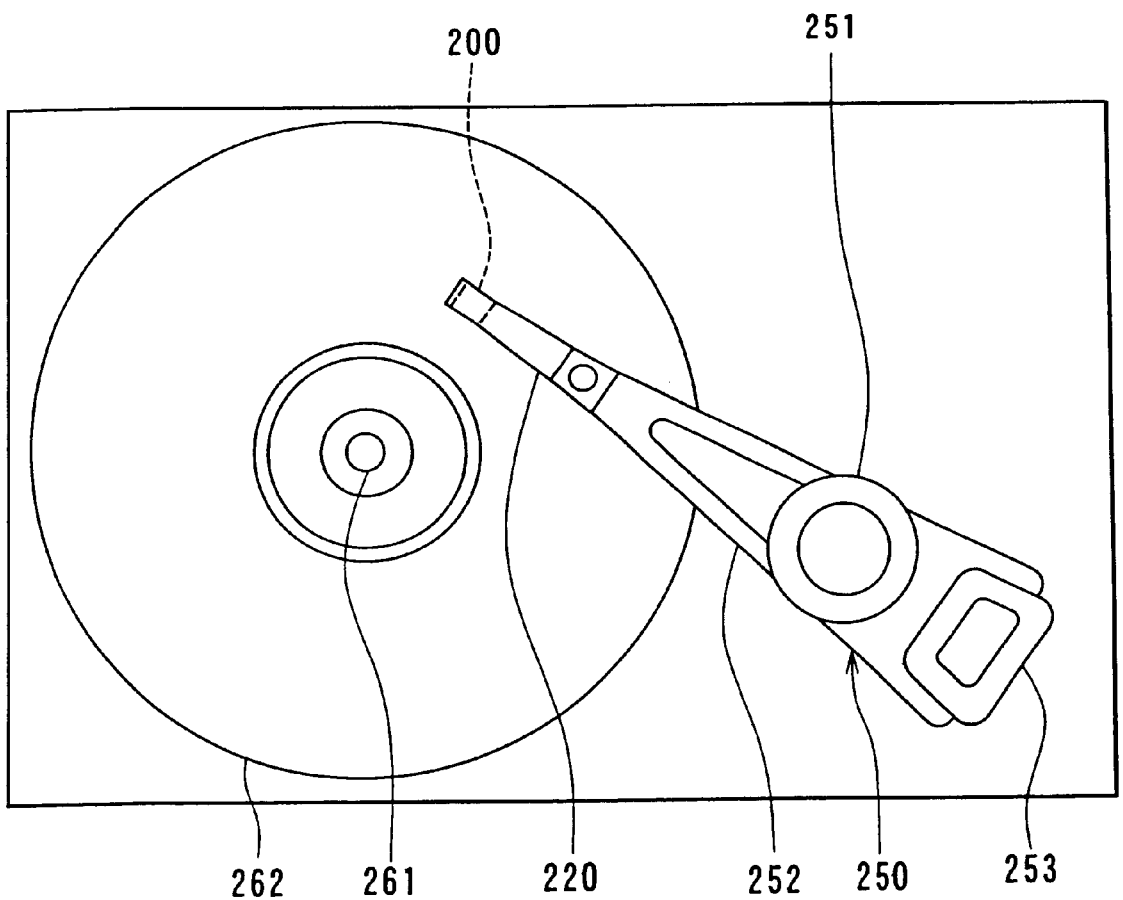
FIG. 26 is a top view of the hard disk drive incorporating the thin-film magnetic head in the first embodiment of the invention.

Reference is now made to FIGS. 24 to 26 to describe a head gimbal assembly and a hard disk drive incorporating a slider 200 that incorporates the thin-film magnetic head in this embodiment. A head gimbal assembly 220 will now be described with reference to FIG. 24. In a hard disk drive, the slider 200 is disposed to face toward a hard disk platter 262 that is a circular-plate-shaped recording medium to be rotated and driven. The head gimbal assembly 220 comprises the slider 200 and a suspension 221 that flexibly supports the slider 200. The suspension 221 incorporates: a plate-spring-shaped load beam 222 made of stainless steel, for example; a flexure 223 to which the slider 200 is joined, the flexure being provided at an end of the load beam 222 and giving an appropriate degree of freedom to the slider 200; and a base plate 224 provided at the other end of the load beam 222. The base plate 224 is attached to an arm 230 of an actuator that moves the slider 200 along the x direction across the track of the hard disk platter 262. The actuator incorporates the arm 230 and a voice coil motor that drives the arm 230. A gimbal section that maintains the orientation of the slider 200 is provided in the portion of the flexure 223 on which the slider 200 is mounted.

The head gimbal assembly 220 is attached to the arm 230 of the actuator. An assembled body comprising the arm 230 and the head gimbal assembly 220 attached to the arm 230 is called a head arm assembly. An assembled body comprising a plurality of head gimbal assemblies 220 and a carriage with a plurality of arms is called a head stack assembly, in which the head gimbal assemblies 220 are each attached to the arms.

FIG. 24 illustrates an example of the head arm assembly. In this head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Reference is now made to FIGS. 25 and 26 to describe an example of the head stack assembly and the hard disk drive. FIG. 25 is an explanatory view illustrating the main part of the hard disk drive. FIG. 26 is a top view of the hard disk drive. The head stack assembly 250 incorporates a carriage 251 having a plurality of arms 252. A plurality of head gimbal assemblies 220 are each attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the hard disk drive. The hard disk drive includes a plurality of hard disk platters 262 mounted on a spindle motor 261. Two of the sliders 200 are allocated to each of the platters 262, such that the two sliders 20 face each other with each of the platters 262 in between. The voice coil motor includes permanent magnets 263 located to face each other, the coil 253 of the head stack assembly 250 being placed between the magnets 263.

The head stack assembly 250 except the slider 200 and m the actuator support the slider 200 and align it with respect to the hard disk platter 262.

In this hard disk drive, the actuator moves the slider 200 across the track of the hard disk platter 262 and aligns the slider 200 with respect to the hard disk platter god 262. The thin-film magnetic head incorporated in the slider 200 writes data on the hard disk platter 262 through the use of the recording head and reads data stored on the hard disk platter 262 through the use of the reproducing head.

[Second Embodiment]

Reference is now made to FIGS. 27A to 36A and FIGS. 27B to 36B to describe a method of manufacturing a thin-film magnetic head according to a second embodiment of the invention. FIGS. 27A to 36A are cross sections each orthogonal to the air bearing surface and the top surface of the substrate. FIGS. 27B to 36B are cross sections of the magnetic pole portions each parallel to the air bearing surface.

Up to the step of forming the inter-coil insulating film 15, the manufacturing method of this embodiment has the same steps as the foregoing ones described with reference to FIGS. 1A to 7A and FIGS. 1B to 7B.

Then, in this embodiment, as shown in FIGS. 27A and 27B, an electrode film 31 for a second thin-film coil is formed of Cu by CVD, for example, to a thickness of about 50 to 100 nm so as to cover the entire top surface of the laminate. The material of the electrode film 31 is not limited to Cu but may be Ta, W, TiN, TiW or Ti, for example.

Then, although not shown, a frame to be used for forming a second thin-film coil 32 described later by frame plating is formed on the electrode film 31 by photolithography.

Then, as shown in FIGS. 28A and 28B, electroplating is performed using the electrode film 31, to form a conductive layer $32p$ for the second thin-film coil, made of Cu, for example, to a thickness of approximately 3 to 4 $\mu$m. Using the conductive layer $32p$ as a mask, a portion of the electrode film 31 other than that underlying the conductive layer $32p$ is removed by ion beam etching, for example. Then, an insulating layer 33 made of alumina, for example, is formed to a thickness of 3 to 4 $\mu$m so as to cover the conductive layer $32p$ and the inter-coil insulating film 15.

Figures 29A, 29B:
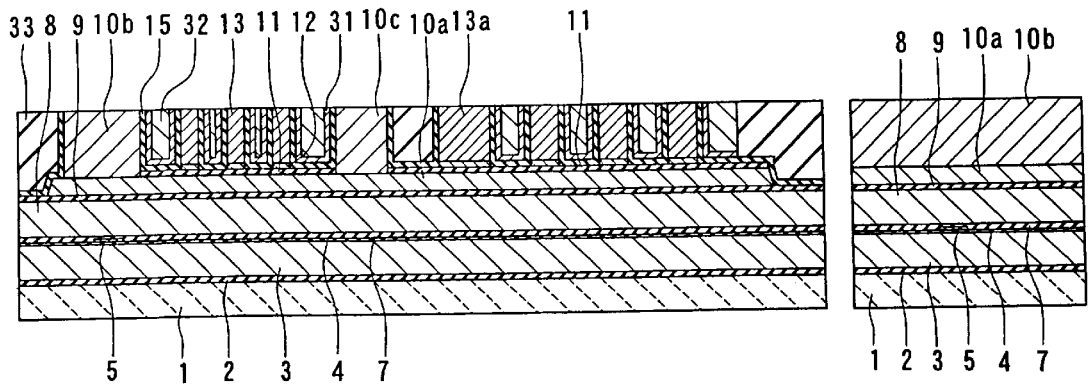
FIGS. 29A and 29B are cross sections for illustrating a step that follows FIGS. 28A and 28B.

As shown in FIGS. 29A and 29B, the insulating layer 33 and the conductive layer $32p$ are polished by CMP, for example, so that the second layer 10b, the coupling layer 10c and the first thin-film coil 13 are exposed and the top surfaces of these elements and the top surface of the insulating layer 33 are flattened. As a result, the conductive layer $32p$ remaining in such a groove as the space between the turns of the first thin-film coil 13 makes the second thin-film coil 32. The polishing mentioned above is performed so that the first thin-film coil 13 and the second thin-film coil 32 each have a thickness of no smaller than 1.8 $\mu$m or no smaller than 2.0 $\mu$m, for example. Although not shown, the second thin-film coil 32 has a connecting portion to be connected to the connecting portion 13a of the first thin-film coil 13.

Figures 30A, 30B:
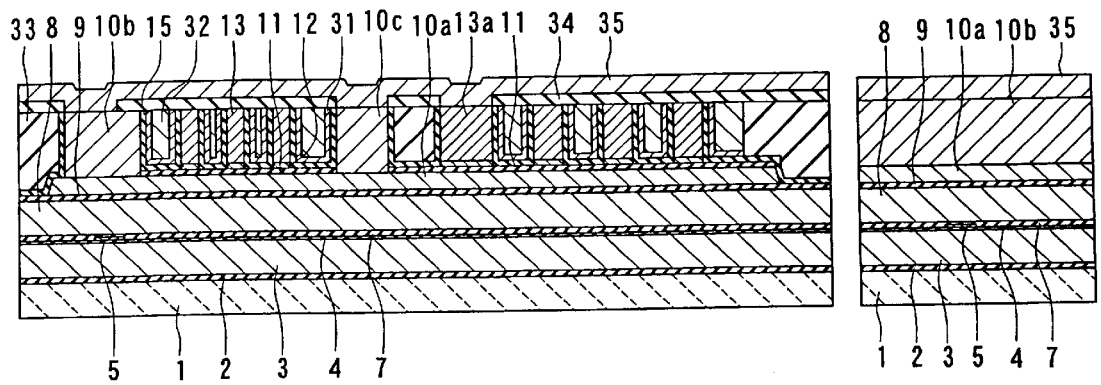
FIGS. 30A and 30B are cross sections for illustrating a step that follows FIGS. 29A and 29B.

As shown in FIGS. 30A and 30B, a coil coat insulating film 34 made of alumina, for example, is formed to a thickness of 0.5 to 0.7 $\mu$m to cover the entire top surface of the laminate. Then, the coil coat insulating film 34 is selectively etched to remove portions thereof corresponding to the second layer 10b, the coupling layer 10c, the connecting portion 13a of the first thin-film coil 13, and the connecting portion of the second thin-film coil 32. This etching is effected by RIE with a chlorine-base gas such as $Cl_2$ or $BCl_3$, using a photoresist film as a mask. The coil coat insulating film 34 after the etching covers the top surfaces of the thin-film coils 13 and 32 except the connecting portion 13a of the first thin-film coil 13 and the connecting portion of the second thin-film coil 32.

Then, a magnetic layer 35 of a magnetic material is formed to a thickness of 0.5 to 1.0 $\mu$m so as to cover the entire top surface of the laminate. The magnetic layer 35 may be formed of NiFe (Ni: 45 weight %; Fe: 55 weight %), CoNiFe (Co: 10%, Ni: 20%, Fe: 70%) or FeCo (Fe: 67%, Co: 33%) that is a high saturation flux density material, by 4 means of plating. Alternatively, the magnetic layer 35 may be formed of FeCoN, FeAlN, FeN, FeCo, FeZrN or the like that is a high saturation flux density material, by means of sputtering. Here, by way of example, the magnetic layer 35 shall be formed of FeCoN by sputtering.

Then, as shown in FIGS. 31A and 31B, the magnetic layer 35 is polished by CMP, for example, so that the coil coat insulating film 34 is exposed, and the top surfaces of the coil coat insulating film 34 and the magnetic layer 35 are thereby flattened. This polishing is performed so that the magnetic layer 35 finally has a thickness of 0.3 to 0.6 µm. The magnetic layer 35 remaining after the polishing makes the third layer 10d of the bottom pole layer on the second layer 10b, the coupling layer 10e on the coupling layer 10c, the connecting layer 21 a on the connecting portion 13a of the first thin-film coil 13, and a not-shown connecting layer on the not-shown connecting portion of the second thin-film coil 32. The end of the third layer 10d located farther from the air bearing surface defines the throat height of the recording head.

Then, the recording gap layer 22 of an insulating material such as alumina is formed to a thickness of 0.06 to 0.1 µm so as to cover the entire top surface of the laminate.

Then, as shown in FIGS. 32A and 32B, the magnetic layer 23 of a magnetic material is formed to a thickness of 0.5 to 1.2 µm so as to cover the entire top surface of the laminate. The magnetic layer 23 may be formed of NiFe (Ni: 45 weight %; Fe: 55 weight %), CoNiFe (Co: 10%, Ni: 20%, Fe: 70%) or FeCo (Fe: 67%, Co: 33%) that is a high saturation flux density material, by means of plating. Alternatively, the magnetic layer 23 may be formed of FeCoN, FeAlN, FeN, FeCo, FeZrN or the like that is a high saturation flux density material, by means of sputtering. Here, by way of example, the magnetic layer 23 shall be formed of FeCoN by sputtering.

On the magnetic layer 23, the second layer 24b of the top pole layer 24 and the connecting layer 21c are each formed to a thickness of 1.0 to 2.0 µm by frame plating, for example. The second layer 24b and the connecting layer 21c are each made of a magnetic material such as NiFe. The second layer 24b extends from a position corresponding to the third layer 10d of the bottom pole layer 10 to a position corresponding to the coupling layer 10e. The connecting layer 21c extends from a position corresponding to the connecting portion 13a of the first thin-film coil 13 to a position corresponding to the not-shown connecting portion of the second thin-film coil 32.

Then, as shown in FIGS. 33A and 33B, the magnetic layer 23 is selectively etched using the second layer 24b and the connecting layer 21c as masks. As a result, the magnetic layer 23 remaining after the etching makes the first layer 24a of the top pole layer 24 and the connecting layer 24b. Conditions for the etching of the magnetic layer 23 are the same as those in the first embodiment. The top pole layer 24 has the same composition and shape as in the first embodiment. The connecting layers 24b and 21c connect the connecting portion 13a of the first thin-film coil 13 and the connecting portion of the second thin-film coil 32 to each other.

Then, as shown in FIGS. 34A and 34B, the recording gap layer 22 is etched by RIE with a chlorine-base gas such as $Cl_2$ and $BCl_3$, using the top pole layer 24 as a mask. Then, using the track width defining portion of the top pole layer 24 as a mask, the third layer 10d of the bottom pole layer 10 is partially etched around the track width defining portion by ion beam etching, for example. A photoresist film 36 is then formed to cover the yoke portion of the top pole layer 24 and the connecting layer 21c.

Figures 35A, 35B:
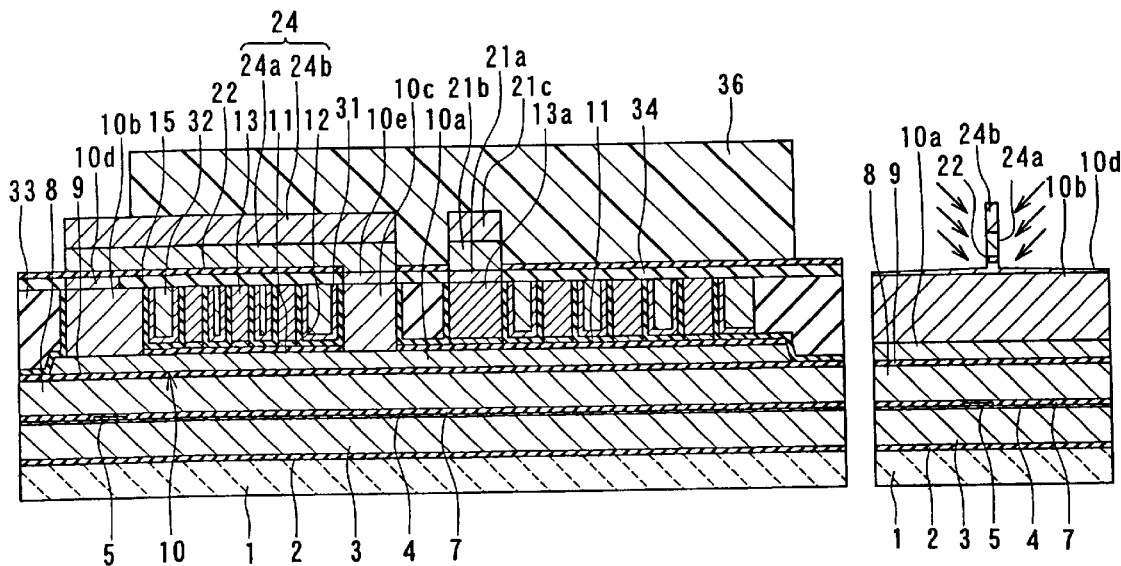
FIGS. 35A and 35B are cross sections for illustrating a step that follows FIGS. 34A and 34B.

As shown in FIGS. 35A and 35B, the photoresist film 36 is used as a mask to perform ion beam etching, for example, to etch the sidewalls of the track width defining portion of the top pole layer 24, the sidewalls of the recording gap layer 22 and the sidewalls of a portion of the third layer 10d underlying the track width defining portion. This reduces the recording track width and forms a trim structure as shown in FIG. 35B.

Figures 36A, 36B:
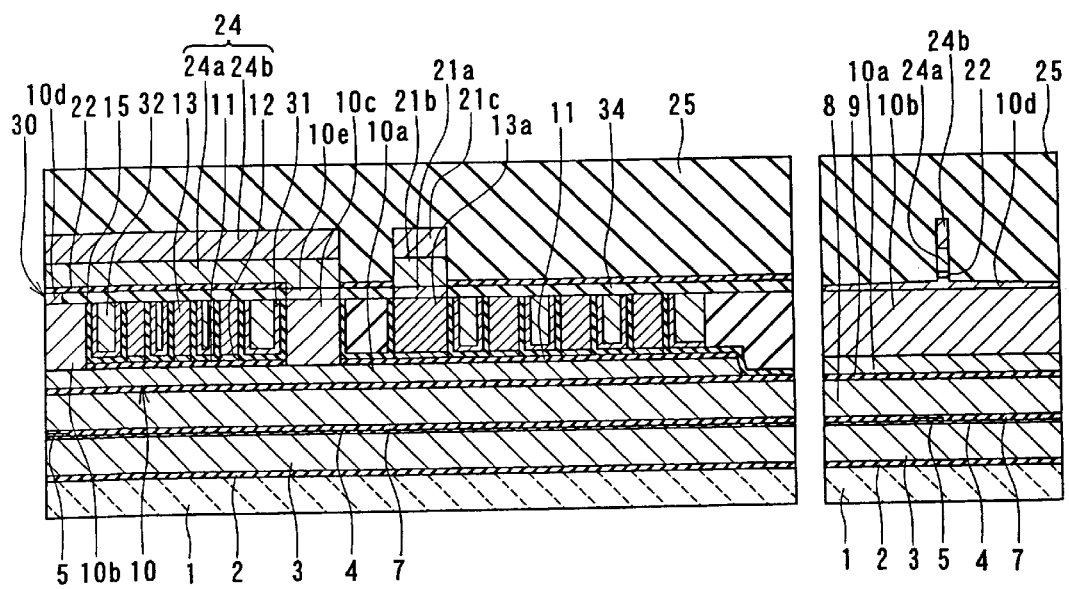
FIGS. 36A and 36B are cross sections for illustrating a step that follows FIGS. 35A and 35B.

Then, as shown in FIGS. 36A and 36B, the overcoat layer 25 made of alumina, for example, is formed to a thickness of 20 to 40 µm so as to cover the entire top surface of the laminate. Its surface is flattened and not-shown electrode pads are formed thereon. Finally, lapping of the slider including the foregoing layers is performed to form the air bearing surface 30 of the recording head and the reproducing head, thereby completing the thin-film magnetic head.

The remainder of the configuration, functions and effects of this embodiment are the same as those of the first embodiment.

[Third Embodiment]

Reference is now made to FIGS. 37A to 50A and FIGS. 37B to 50B to describe a method of manufacturing a thin-film magnetic head according to a third embodiment of the invention. FIGS. 37A to 50A are cross sections each orthogonal to the air bearing surface and the top surface of the substrate. FIGS. 37B to 50B are cross sections of the magnetic pole portions each parallel to the air bearing surface.

The manufacturing method of this embodiment is the same as that of the first embodiment up to the step of forming the magnetic layer 10ap as shown in FIGS. 1A and 1B. Then, in this embodiment, as shown in FIGS. 37A and 37B, an insulating film 41 made of alumina, for example, is formed on the magnetic layer 10ap to a thickness of 0.2 µm. Although not shown, a photoresist film is then formed on the insulating film 41 in a region in which a thin-film coil 43 described later is to be formed. Using this photoresist film as a mask, the insulating film 41 is selectively etched so that a portion of the insulating film 41 remains in the region in which the thin-film coil 43 is to be formed.

Then, an electrode film 42 for the thin-film coil, made of a conductive material, is formed by sputtering, for example, so as to cover the magnetic layer 10ap and the insulating film 41. This electrode film 42 functions as an electrode and a seed layer for plating. The electrode film 42 is made up of, for example, a 5-nm-thick Ti layer and a 50-nm-thick Cu layer formed thereon. To attain closer contact between the magnetic layer 10ap or the insulating film 41 and the thin-film coil 43, a layer of a high-melting metal such as Ta and W may be formed, instead of the above-mentioned Ti layer, on the magnetic layer 10ap and the insulating film 41.

Then, although not shown, a frame to be used for forming the thin-film coil 43 by frame plating is formed on the electrode film 42 by photolithography.

Electroplating is then performed using the electrode film 42, thereby forming the thin-film coil 43 of, e.g., Cu, to a thickness of approximately 1.5 to 2.0 µ. The thin-film coil 43 is disposed within the region where the insulating film 41 lies. In FIG. 37A, the reference numeral 43a represents a connecting portion of the thin-film coil 43 to be connected to a lead layer described later.

As shown in FIGS. 38A and 38B, a portion of the electrode film 42 other than that underlying the thin-film coil 43 is removed by ion beam etching, for example.

Next, although not shown, a frame to be used to form the second layer 10b, the third layer 10d and the coupling layers 10c and 10e of the bottom poles layer by frame plating is formed on the magnetic layer 10*ap* and the insulating film 41 by photolithography.

Then, as shown in FIGS. 39A and 39B, electroplating is performed so that the second layer 10*b* and the coupling layer 10*c*, each made of a magnetic material, are formed on the magnetic layer 10*ap* to a thickness of, e.g., 1.5 µm each. Electroplating is further performed successively to form the third layer 10*d* and the coupling layer 10*e* on the second layer 10*b* and the coupling layer 10*c*, respectively. The layers 10*d* and 10*e* are each made of a magnetic material and formed to a thickness of, e.g., 1.5 µm each. In this embodiment, no special electrode film is provided to form the foregoing layers by plating, but the unpatterned magnetic layer 10*ap* is used as an electrode and a seed layer for the plating. The second layer 10*b* and the coupling layer 10*c* are made of CoNiFe, for example. The third layer 10*d* and the coupling layer 10*e* are CoFe layers, for example.

The second layer 10*b* and the third layer 10*d* are disposed near a region in which an air bearing surface described later is to be formed. The end of each of the second and third layers 10*b* and 10*d* located farther from the air bearing surface defines the throat height of the recording head. The coupling layers 10*c* and 10*e* are provided for connecting the first layer 10*a* and a top pole layer to be described later to each other, and are disposed near the center of the thin-film coil 43.

In this embodiment, a part of the thin-film coil 43 located farther from the air bearing surface than the coupling layer 10*c* is greater in the line width of the winding and the winding pitch than a part located closer to the air bearing surface than the coupling layer 10*c*. This makes it possible to attain a smaller yoke length and to reduce the total resistance value of the thin-film coil 43.

For example, in the region between the second layer 10*b* and the coupling layer 10*c*, the thin-film coil 43 has a line width of the winding of 0.2-0.35 µm, and a winding pitch of 0.35-0.65 µm. In the region located farther from the air bearing surface than the coupling layer 10*c*, the thin-film coil 43 has a line width of the winding of 0.4-0.6 µm, and a winding pitch of 0.55-0.9 µm.

Then, as shown in FIGS. 40A and 40B, a photoresist layer 44 is formed to cover the thin-film coil 43, the second and third layers 10*b* and 10*d*, and the coupling layers 10*c* and 10*e*. Using the photoresist layer 44 as a mask, the magnetic layer 10*ap* is selectively etched by ion beam etching, for example.

In this way, the magnetic layer 10*a* is patterned to complete the first layer 10*a* as shown in FIGS. 41A and 41B. Then, the photoresist layer 44 is removed.

Next, as shown in FIGS. 42A and 42B, an insulating layer 46 made of photoresist, for example, is formed to a thickness of 1.0 to 2.0 µm so as to cover the thin-film coil 43. The insulating layer 46 is formed to fill at least a space between turns of the thin-film coil 43. Part of the insulating layer 46 is disposed outside the outer periphery of the thin-film coil 43 and inside the inner periphery of the same. Then, an insulating layer 47 made of alumina, for example, is formed to a thickness of 3 to 4 µm so as to cover the second layer 10*b*, the third layer 10*d*, the coupling layers 10*c* and 10*e*, and the insulating layer 46.

Then, as shown in FIGS. 43A and 43B, the insulating layer 47 is polished by CMP, for example, so that the third layer 10*d* and the coupling layer 10*e* are exposed and the top surfaces of the third layer 10*d*, the coupling layer 10*e* and the insulating layer 47 are flattened. At this time, however, the insulating layer 46 is kept unexposed.

Then, as shown in FIGS. 44A and 44B, the recording gap layer 22 of an insulating material such as alumina is formed to a thickness of 0.06 to 0.1 µm so as to entirely cover the flattened top surface of the laminate. The recording gap layer 22 is then selectively etched to remove portions thereof corresponding to the third layer 10*d*, the coupling layer 10*e* and the connecting portion 43*a* of the thin-film coil 43. The insulating layer 46 is also etched to remove a portion thereof located on the connecting portion 43*a*. The etching is effected by, for example, ion beam etching or RIE with a chlorine-base gas such as $Cl_2$ or $BCl_3$ using a photoresist film as a mask.

Figures 45A, 45B:
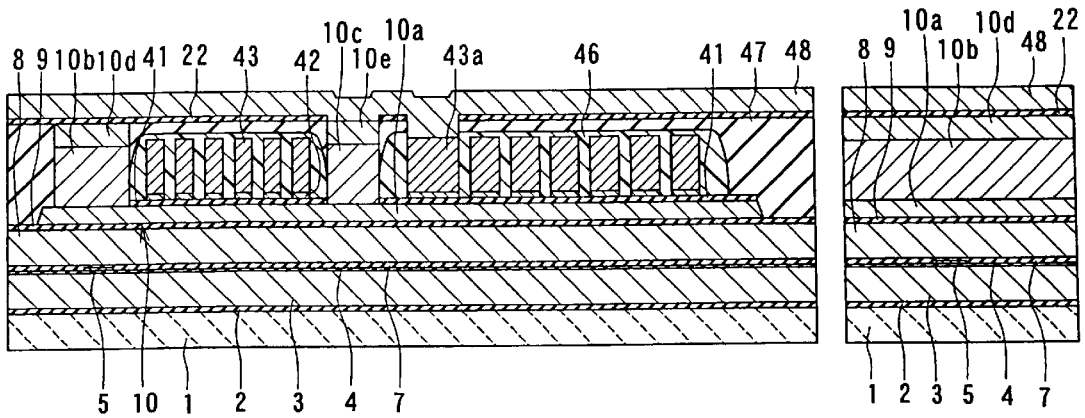
FIGS. 45A and 45B are cross sections for illustrating a step that follows FIGS. 44A and 44B.

As shown in FIGS. 45A and 45B, a magnetic layer 48 of a magnetic material is formed to a thickness of 0.5 to 1.0 µm so as to cover the entire top surface of the laminate. The magnetic layer 48 may be formed of NiFe (Ni: 45 weight %; Fe: 55 weight %), CoNiFe (Co: 10%, Ni: 20%, Fe: 70%) or FeCo (Fe: 67%, Co: 33%) that is a high saturation flux density material, by means of plating. Alternatively, the magnetic layer 48 may be formed of FeCoN, FeAlN, FeN, FeCo, FeZrN or the like that is a high saturation flux density material, by means of sputtering. Here, by way of example, the magnetic layer 48 shall be formed of FeCoN by sputtering.

Figures 46A, 46B:
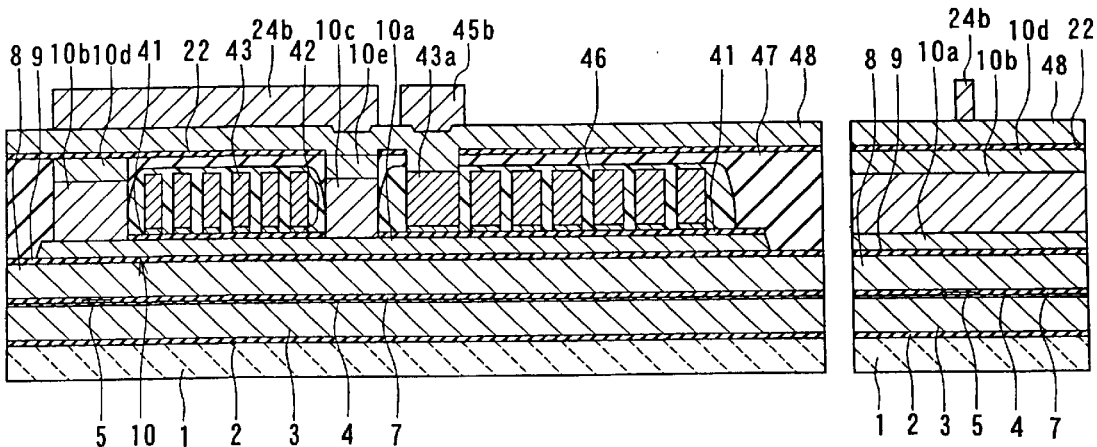
FIGS. 46A and 46B are cross sections for illustrating a step that follows FIGS. 45A and 45B.

On the magnetic layer 48, as shown in FIGS. 46A and 46B, the second layer 24*b* of the top pole layer 24 and the connecting layer 45*b* are each formed to a thickness of 1.0 to 2.0 µm by frame plating, for example. The second layer 24*b* and the connecting layer 45*b* are each made of a magnetic material such as NiFe. The second layer 24*b* extends from a position corresponding to the third layer 10*d* of the bottom pole layer 10 to a position corresponding to the coupling layer 10*e*. The connecting layer 45*b* extends from a position corresponding to the connecting portion 43*a* of the thin-film coil 43 to an end of one of lead layers to be described later.

Then, as shown in FIGS. 47A and 47B, the magnetic layer 48 is selectively etched using the second layer 24*b* and the connecting layer 45*b* as masks. As a result, the magnetic layer 48 remaining after the etching makes the first layer 24*a* of the top pole layer 24 and the connecting layer 45*a*. The top pole layer 24 has the same composition and shape as in the first embodiment. The connecting layers 45*a* and 45*b* connect the connecting portion 43*a* of the thin-film coil 43 to the end of the one of the lead layers described later. 4 The etching of the magnetic layer 48 is effected by RIE using a chlorine-base gas such as $Cl_2$, $BCl_3$, and $Cl_2+BCl_3$, or a mixture of this chlorine-base gas and $O_2$, $N_2$ $H_2HCl$, Ar, or He. The etching temperature falls within the range of 50 to 300° C. inclusive. Here, by way of example, the etching temperature shall be 250° C.

Then, as shown in FIGS. 48A and 48B, the recording gap layer 22 is etched by RIE with a chlorine-base gas such as $Cl_2$ and $BCl_3$, using the top pole layer 24 as a mask.

Then, using the track width defining portion of the top pole layer 24 as a mask, the third layer 10*d* of the bottom pole layer 10 is partially etched around the track width defining portion by ion beam etching, for example. A trim structure as shown in FIG. 48B is thereby formed.

Figures 49A, 49B:
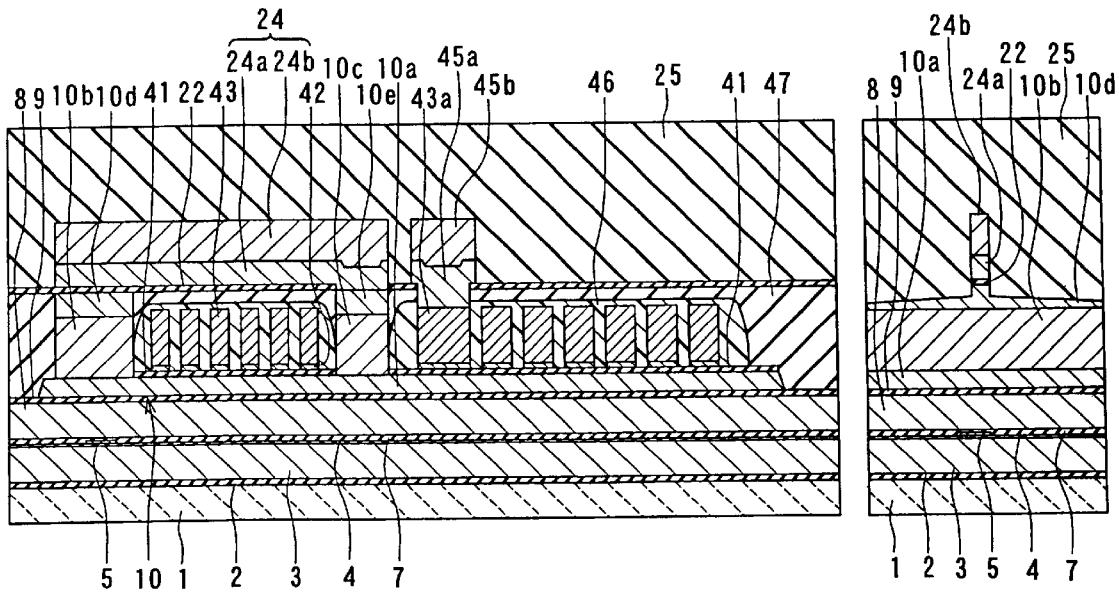
FIGS. 49A and 49B are cross sections for illustrating a step that follows FIGS. 48A and 48B.

Then, as shown in FIGS. 49A and 49B, the overcoat layer 25 made of alumina, for example, is formed to a thickness of 20 to 40 µm so as to cover the entire top surface of the laminate. Its surface then is flattened, and not-shown electrode pads are formed thereon.

Figures 50A, 50B:
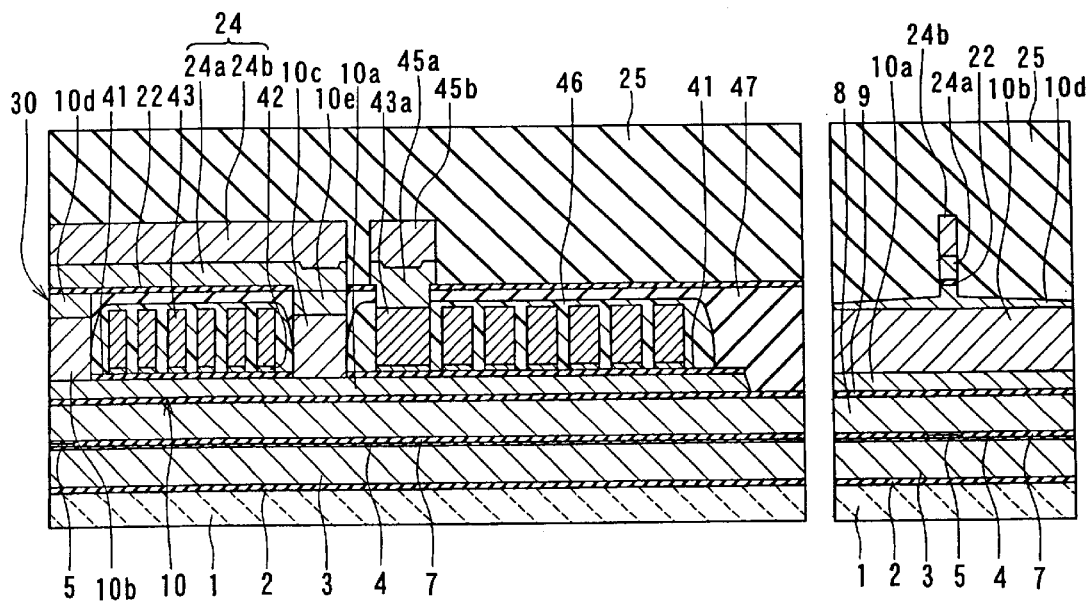
FIGS. 50A and 50B are cross sections for illustrating a step that follows FIGS. 49A and 49B.

Finally, as shown in FIGS. 50A and 50B, lapping of the slider including the foregoing layers is performed to form the air bearing surface 30 of the recording head and the reproducing head, thereby completing the thin-film magnetic head.

Figure 51:
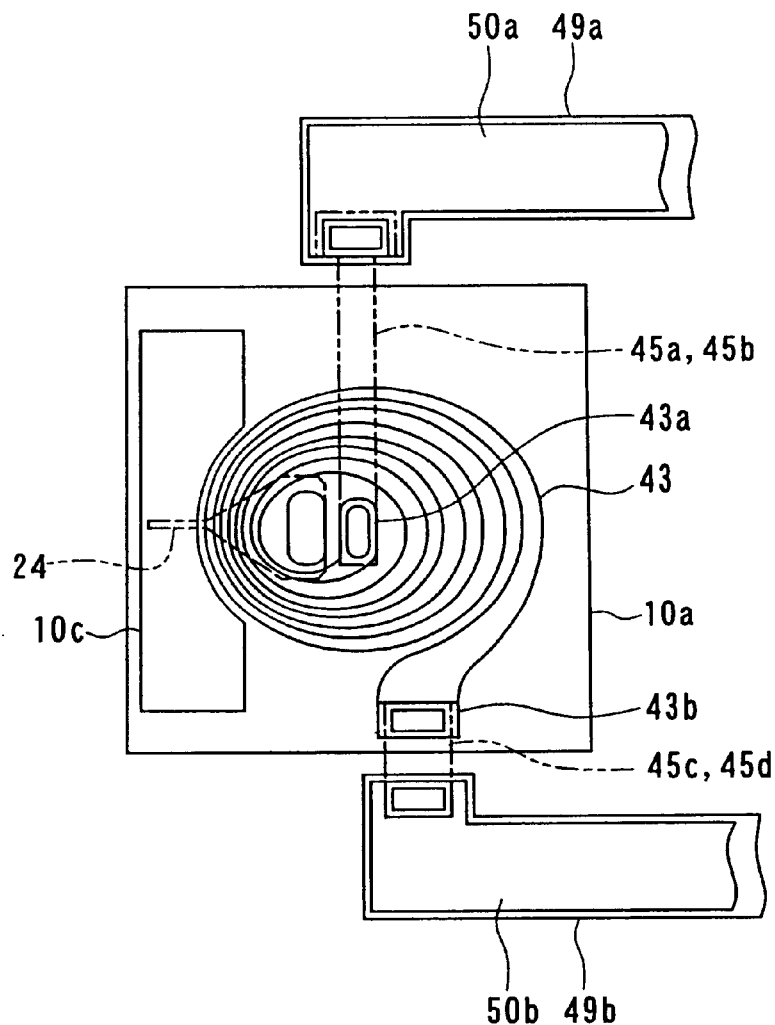
FIG. 51 is a plan view showing the relationship between a thin-film coil and lead layers in the third embodiment of the invention.

FIG. 51 is a plan view showing the relationship between the thin-film coil 43 and the lead layers. As shown in FIG. 51, the thin-film magnetic head has the lead layers 50a and 50b. The lead layer 50a is connected to the connecting portion 43a, that is, the inner end of the winding of the thin-film coil 43. The lead layer 50b is connected to a connecting portion 43b, that is, the outer end of the winding of the thin-film coil 43. The lead layers 50a and 50b are formed on base layers 49a and 49b, respectively, the base layers each being made of a material the same as that of the first layer 10a of the bottom pole layer 10. The base layers 49a and 49b are disposed outside the first layer 10a. The base layers 49a, 49b and the first layer 10a are formed at the same time by patterning the magnetic layer 10ap. The lead layers 50a and 50b are each made of a material the same as that of the thin-film coil 43, and are formed at the same time as the thin-film coil 43.

The connecting portion 43a and the lead layer 50a are connected to each other by the connecting layers 45a and 45b. The connecting portion 43b and the lead layer 50b are connected to each other by connecting layers 45c and 45d. The connecting layers 45a and 45c, and the first layer 24a of the top pole layer 24 are all formed by selectively etching the magnetic layer 48. The connecting layers 45b and 45d are each made of a material the same as that of the second layer 24b of the top pole layer 24, and are formed at the same time as the second layer 24b.

The remainder of the configuration, functions and effects of this embodiment are the same as those of the first embodiment.

[Fourth Embodiment]

Reference is now made to FIGS. 52 to 56 to describe a method of manufacturing a thin-film magnetic head according to a fourth embodiment of the invention. FIGS. 52 to 56 are cross sections each orthogonal to the air bearing surface and the top surface of the substrate.

Figure 52:
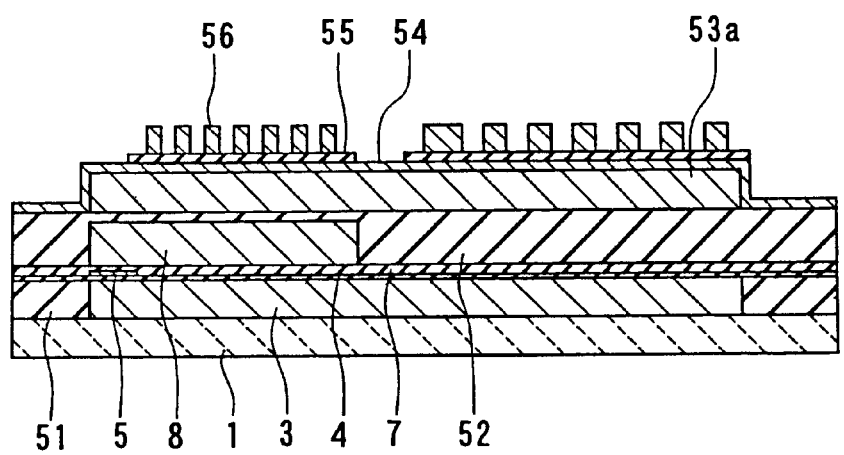
FIG. 52 is a cross section for illustrating a step in a method of manufacturing a thin-film magnetic head according to a fourth embodiment of the invention.

In the method of manufacturing the thin-film magnetic head of this embodiment, as shown in FIG. 52, the bottom shield layer 3 patterned into a predetermined shape is initially formed on the substrate 1. Then, an insulating layer 51 made of alumina, for example, is formed over the entire surface. The insulating layer 51 is polished by CMP, for example, to expose the bottom shield layer 3, and the surface is thereby flattened.

Then, the bottom shield gap film 4 is formed on the entire top surface of t he laminate. The MR element 5 is then formed on the bottom shield gap film 4. Then, although not shown, a pair of electrode layers to be electrically connected to the MR element 5 are formed on the bottom shield gap film 4. The top shield gap film 7 is then formed on the bottom shield gap film 4 and the MR element 5, and the MR element 5 is embedded in the shield gap films 4 and 7.

On the top shield gap film 7, the top shield layer 8 patterned into a predetermined shape is formed. Then, an insulating layer 52 made of alumina, for example, is formed all over and the surface of the insulating layer 52 is flattened by CMP, for example. At this time, the top shield layer 8 is kept unexposed.

Then, a first layer 53a of a bottom pole layer 53 to be described later is formed on the flattened insulating layer 52. The first layer 53a has a wholly flat top surface. In this embodiment, the first layer 53a is patterned into a predetermined shape from the beginning of its formation. The bottom pole layer 53 includes the first layer 53a, and a second layer 53b and a coupling layer 53c to be described later. The material and forming method of the first layer 53a are the same as those of the first layer 10a in the first embodiment.

Then, an electrode film 54 of a conductive material is formed on the entire top surface of the laminate by sputtering, for example. The electrode film 54 functions as an electrode and a seed layer for forming the second layer 53b and the coupling layer 53c of the bottom pole layer 53 to be described later by plating. On the electrode film 54, an insulating film 55 made of alumina, for example, is formed in a region where to form a thin-film coil 56 to be described later. An electrode film for coil formation, which is not shown, is then formed on the insulating film 55. This electrode film for coil formation functions as an electrode and a seed layer for forming the thin-film coil 56 by plating. Then, the thin-film coil 56 is formed on the electrode film for coil formation by frame plating. A portion of the electrode film for coil formation other than that underlying the thin-film coil 56 is removed by ion beam etching, for example.

Figure 53:
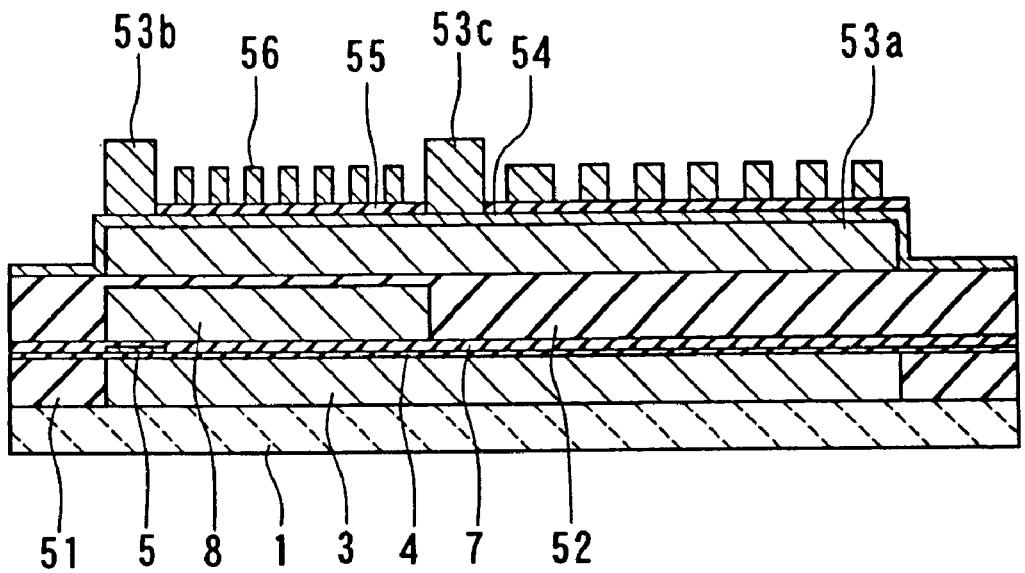
FIG. 53 is a cross section for illustrating a step that follows FIG. 52.

Then, as shown in FIG. 53, the second layer 53b and the coupling layer 53c are formed on the electrode film 54 by frame plating. The second layer 53b is disposed near a region where to form an air bearing surface to be described later. The coupling layer 53c is provided for connecting the first layer 53a and a top pole layer to be described later to each other, and is disposed near the center of the thin-film coil 56.

Figure 54:
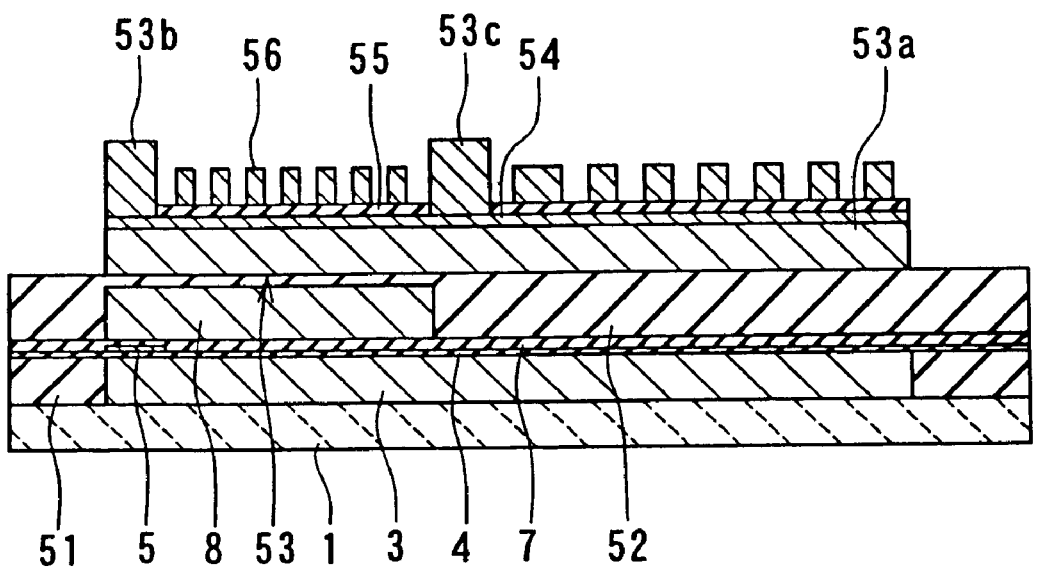
FIG. 54 is a cross section for illustrating a step that follows FIG. 53.

Then, as shown in FIG. 54, a portion of the electrode film 54 other than that underlying the second layer 53b, the coupling layer 53c and the insulating film 55 is removed by ion beam etching, for example.

Figure 55:
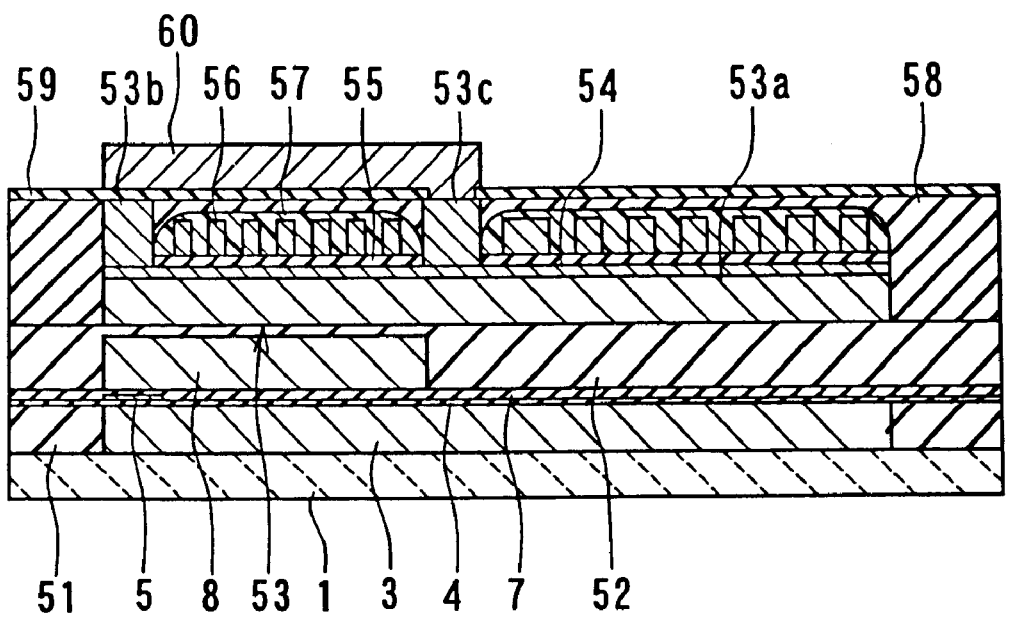
FIG. 55 is a cross section for illustrating a step that follows FIG. 54.

Then, as shown in FIG. 55, a photoresist layer 57 is formed so as to cover the thin-film coil 56. An insulating layer 58 made of alumina, for example, is then formed so as to cover the entire top surface of the laminate. The insulating layer 58 is polished by CMP, for example, so that the second layer 53b and the coupling layer 53c are exposed and the top surfaces of the second layer 53b, the coupling layer 53c and the insulating layer 58 are flattened. Then, a recording gap layer 59 of an insulating material such as alumina is formed so as to cover the entire top surface of the laminate. A portion of the recording gap layer 59 that lies on the coupling layer 53c is selectively removed by etching, thereby forming a contact hole. Then, a top pole layer 60 patterned into a predetermined shape is formed on the recording gap layer 59. The top pole layer 60 is connected to the coupling layer 53c through the above-mentioned contact hole.

Figure 56:
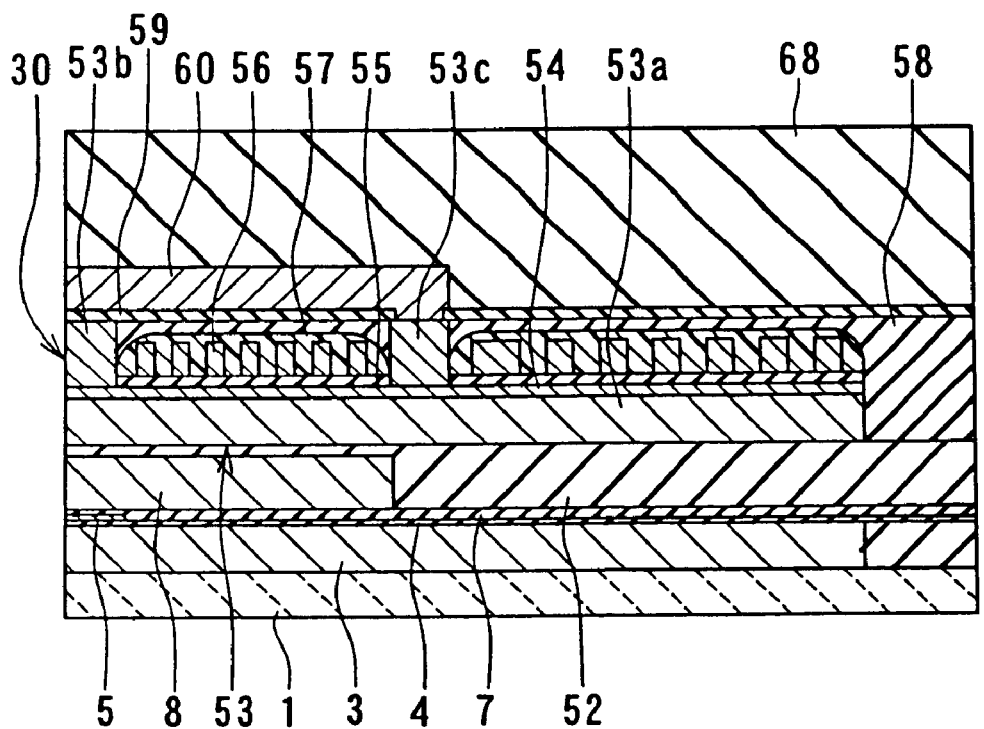
FIG. 56 is a cross section for illustrating a step that follows FIG. 55.

Then, as shown in FIG. 56, an overcoat layer 68 made of alumina, for example, is formed to cover the entire top surface of the laminate. Its surface is flattened, and not-shown electrode pads are formed thereon. Finally, lapping of the slider including the foregoing layers is performed to form the air bearing surface 30 of the recording head and the reproducing head, thereby completing the thin-film magnetic head.

The bottom pole layer 53 and the top pole layer 60 of this embodiment correspond to the first pole layer and the second pole layer of the invention, respectively.

This embodiment differs from the first through third embodiments in that the first layer 53a of the bottom pole layer 53 is patterned into a predetermined shape from the beginning of its formation. The first layer 53a, however, has a wholly flat top surface like in the first through third embodiments. In this embodiment, after forming the thin-film coil 56 on the first layer 53a, the second layer 53b and the coupling layer 53c are formed on the first layer 53a. Therefore, like the first through third embodiments, this embodiment makes it possible to form the thin-film coil 56 finely with high precision and, as a result, makes it possible to manufacture a thin-film magnetic head having a small yoke length and excellent recording characteristics at high frequency bands. Thus, the configuration, functions and effects of this embodiment are the same as those of the first embodiment except for the difference that the first layer 53*a* of the bottom pole layer 53 in this embodiment is patterned to a predetermined shape from the beginning of its formation.

[Fifth Embodiment]

Reference is now made to FIGS. 57 to 60 to describe a method of manufacturing a thin-film magnetic head according to a fifth embodiment of the invention. FIGS. 57 to 60 are cross sections each orthogonal to the air bearing surface and the top surface of the substrate.

Figure 57:
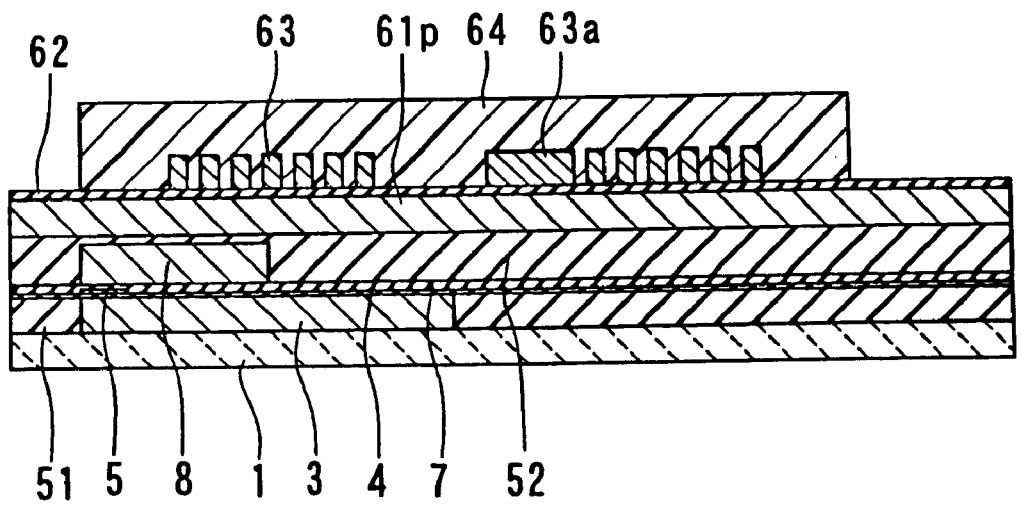
FIG. 57 is a cross section for illustrating a step in a method of manufacturing a thin-film magnetic head according to a fifth embodiment of the invention.

The manufacturing method of this embodiment is the same as that of the fourth embodiment up to the step of flattening the surface of the insulating layer 52 as shown in FIG. 57. Then, in this embodiment, a magnetic layer 61*p* that is to be a bottom pole layer 61 to be described later is formed on the flattened insulating layer 52. The magnetic layer 61*p* has a wholly flat top surface. The material and forming method of the magnetic layer 61*p* are the same as those of the first layer 10*a* of the first embodiment.

Then, a recording gap layer 62 of an insulating material such as alumina is formed on the entire top surface of the laminate. On the recording gap layer 62, formed is an electrode film for coil formation, which is not shown. This electrode film for coil formation functions as an electrode and a seed layer for forming a thin-film coil 63 to be described later by plating. Then, the thin-film coil 63 is formed on the electrode film for coil formation by frame plating. In FIG. 57, the reference numeral 63*a* represents a connecting portion of the thin-film coil 63 to be connected to a lead layer that is not shown. Then, a portion of the electrode film for coil formation other than that underlying the thin-film coil 63 is removed by ion beam etching, for example. A photoresist layer 64 is then formed to cover the thin-film coil 63.

Figure 58:
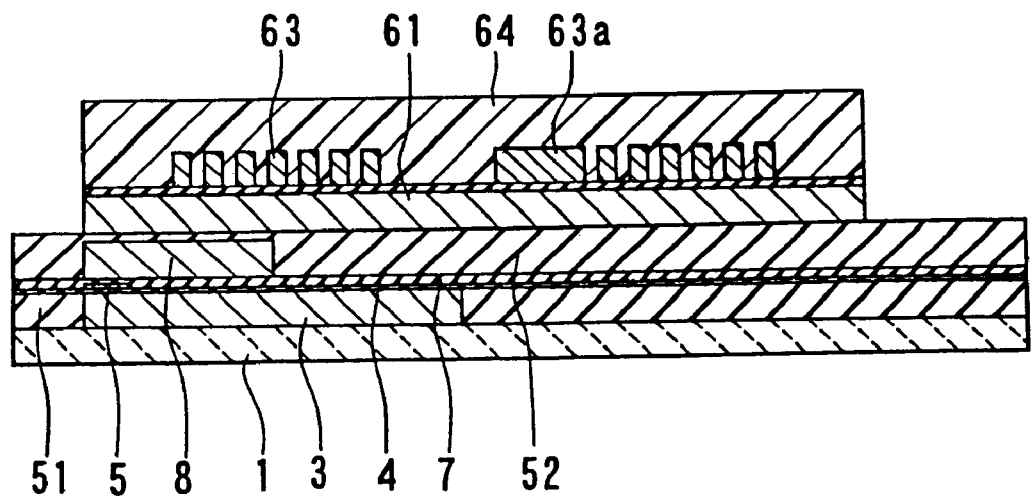
FIG. 58 is a cross section for illustrating a step that follows FIG. 57.

Then, as shown in FIG. 58, the magnetic layer 61*p* is selectively etched by, for example, ion beam etching or RIE, using the photoresist layer 64 as a mask. The magnetic layer 61*p* is thus patterned to complete the bottom pole layer 61.

Figure 59:
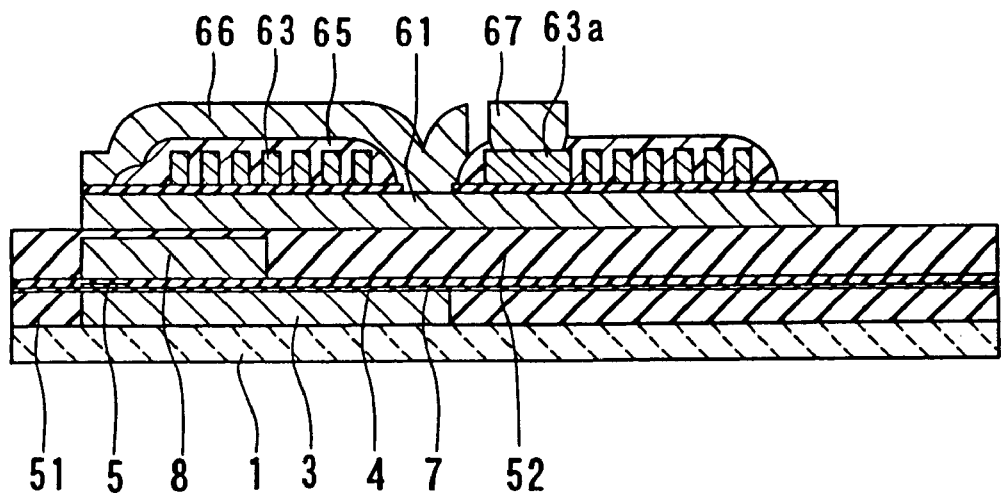
FIG. 59 is a cross section for illustrating a step that follows FIG. 58.

As shown in FIG. 59, after removing the photoresist layer 64, a portion of the recording gap layer 62 located near the center of the thin-film coil 63 is selectively removed by etching to thereby form a contact hole. Then, an insulating layer 65 made of photoresist, for example, is formed to cover the thin-film coil 63. A portion of the insulating layer 65 located on the connecting portion 63*a* is removed by etching. Then, a top pole layer 66 of a magnetic material is formed on the insulating layer 65, and a connecting layer 67 made of a material the same as that of the top pole layer 66 is formed on the connecting portion 63*a*. The magnetic pole portion of the top pole layer 66 is opposed to the bottom pole layer 61, with the recording gap layer 62 in between. The top pole layer 66 is magnetically coupled to the bottom pole layer 61 through the above-mentioned contact hole. The connecting layer 67 is connected to a lead layer that is not shown.

Figure 60:
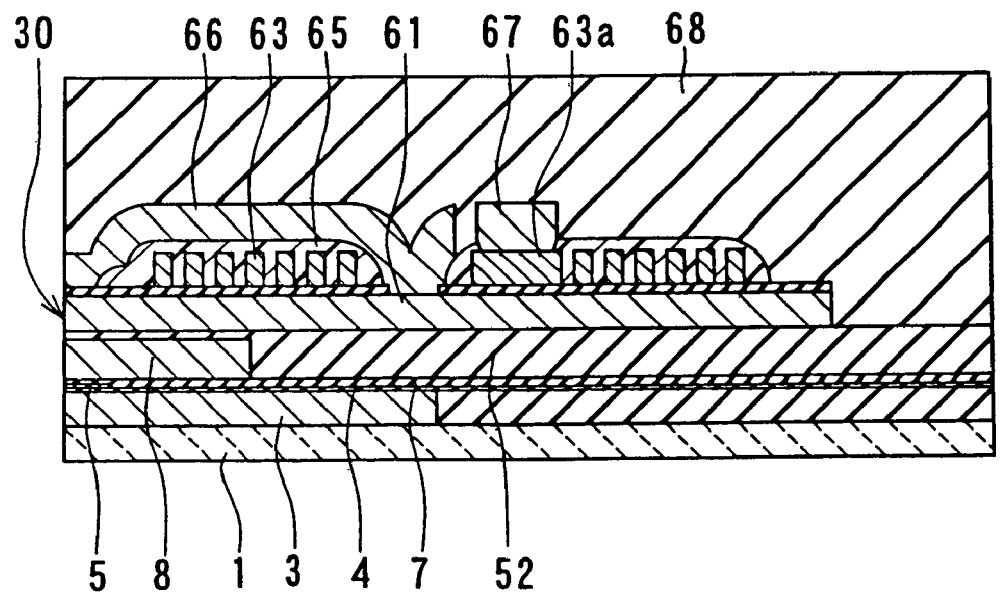
FIG. 60 is a cross section for illustrating a step that follows FIG. 59.

Then, as shown in FIG. 60, the overcoat layer 68 made of alumina, for example, is formed to cover the entire top surface of the laminate. Its surface is flattened, and not-shown electrode pads are formed thereon. Finally, lapping of the slider including the foregoing layers is performed to form the air bearing surface 30 of the recording head and the reproducing head, thereby completing the thin-film magnetic head.

The bottom pole layer 61 and the top pole layer 66 of this embodiment correspond to the first pole layer and the second pole layer of the invention, respectively. Unlike the first through third embodiments, the top pole layer 66 is not a flat layer but a curved layer.

This embodiment differs from the first through third embodiments in that the bottom pole layer 61 is made up of a single layer. In this embodiment, after forming the thin-film coil 63 on the magnetic layer 61*p* having a wholly flat top surface, the magnetic layer 61*p* is patterned to complete the bottom pole layer 61. Therefore, like the first through third embodiments, this embodiment makes it possible to form the thin-film coil 63 finely with high precision and, as a result, makes it possible to manufacture a thin-film magnetic head having a small yoke length and excellent recording characteristics at high frequency bands.

As stated above, the configuration, functions and effects of this embodiment are the same as those of the first embodiment except for the differences in that the bottom pole layer 61 is made up of a single layer and that the top pole layer 66 is a curved layer.

The present invention is not limited to the foregoing embodiments but may be practiced in still other ways. For example, the invention is also applicable to a thin-film magnetic head dedicated to recording that has an induction-type electromagnetic transducer only, or a thin-film magnetic head that performs recording and reproducing operations with an induction-type electromagnetic transducer.

As has been described, in the first method of manufacturing the thin-film magnetic head of the invention, after forming the thin-film coil on the magnetic layer having a wholly flat surface, the first pole layer is completed by at least either patterning the magnetic layer or forming another magnetic layer on the magnetic layer. Therefore, according to the invention, it is possible to form a fine thin-film coil precisely, and, as a result, it is possible to manufacture a thin-film magnetic head having a small yoke length and excellent recording characteristics at high frequency bands.

In the second method of manufacturing the thin-film magnetic head of the invention, the thin-film coil is formed on the magnetic layer that is to be the first layer of the first pole layer and has a wholly flat surface, and then, the second layer of the first pole layer is formed on the magnetic layer. Therefore, according to the invention, it is possible to form a fine thin-film coil m precisely, and, as a result, it is possible to manufacture a thin-film magnetic head having a small yoke length and excellent recording characteristics at high frequency bands.

In the third method of manufacturing the thin-film magnetic head of the invention, the first thin-film coil is formed on the magnetic layer that is to be the first layer of the first pole layer and has a wholly flat top surface, and then, the second layer is formed on the magnetic layer. After that, the magnetic layer is patterned to complete the first layer. Then, in this manufacturing method, the second thin-film coil is formed so that at least part thereof is disposed in a space between turns of the first thin-film coil. Therefore, according to the invention, it is possible to form a fine thin-film coil precisely, and, as a result, it is possible to manufacture a thin-film magnetic head having a small yoke length and excellent recording characteristics at high frequency bands.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin-film magnetic head comprising:
    a medium facing surface that faces toward a recording medium;
    a first pole layer and a second pole layer that are magnetically coupled to each other and include magnetic pole portions opposed to each other and located in regions of the pole layers on a side of the medium facing surface;
    a gap layer provided between the magnetic pole portions of the first and second pole layers; and
    a thin-film coil at least part of which is disposed between the first and second pole layers and insulated from the first and second pole layers, the method comprising the steps of:
        forming a magnetic layer to be used for forming the first pole layer, the magnetic layer having a wholly flat top surface;
        forming the thin-film coil on the magnetic layer;
        completing the first pole layer by at least either patterning the magnetic layer or forming another magnetic layer on the magnetic layer, after the thin-film coil is formed;
        forming the gap layer on the magnetic pole portion of the first pole layer; and
        forming the second pole layer on the gap layer and the thin-film coil.

2. A method of manufacturing a thin-film magnetic head comprising:
    a medium facing surface that faces toward a recording medium;
    a first pole layer and a second pole layer that are magnetically coupled to each other and include magnetic pole portions opposed to each other and located in regions of the pole layers on a side of the medium facing surface;
    a gap layer provided between the magnetic pole portions of the first and second pole layers; and
    a thin-film coil at least part of which is disposed between the first and second pole layers and insulated from the first and second pole layers, wherein:
        the first pole layer includes a first layer disposed to face toward the thin-film coil, and a second layer disposed closer to the medium facing surface than the thin-film coil and connected to a surface of the first layer that is closer to the gap layer, the method comprising the steps of:
            forming a magnetic layer that is to be the first layer and has a wholly flat top surface;
            forming the thin-film coil on the magnetic layer;
            forming the second layer on the magnetic layer after the thin-film coil is formed;
            forming the gap layer on the second layer; and
            forming the second pole layer on the gap layer and the thin-film coil.

3. A method of manufacturing a thin-film magnetic head according to claim 2, further comprising the step of completing the first layer by patterning the magnetic layer after the second layer is formed.

4. A method of manufacturing a thin-film magnetic head according to claim 2, wherein the second pole layer is a flat layer.

5. A method of manufacturing a thin-film magnetic head according to claim 3, wherein:
    in the step of forming the thin-film coil, an insulating film is formed on the magnetic layer in a region in which the thin-film coil is to be formed; then an electrode film for electroplating is formed to cover the magnetic layer and the insulating film; and then electroplating is performed using the electrode film to thereby form the thin-film coil; and
    in the step of forming the second layer, a portion of the electrode film other than a portion thereof underlying the thin-film coil is removed before forming the second layer on the magnetic layer.

6. A method of manufacturing a thin-film magnetic head comprising:
    a medium facing surface that faces toward a recording medium;
    a first pole layer and a second pole layer that are magnetically coupled to each other and include magnetic pole portions opposed to each other and located in regions of the pole layers on a side of the medium facing surface;
    a gap layer provided between the magnetic pole portions of the first and second pole layers; and
    first and second thin-film coils at least part of each of which is disposed between the first and second pole layers and insulated from the first and second pole layers,
    wherein the first pole layer includes a first layer disposed to face toward the first and second thin-film coils, and a second layer disposed closer to the medium facing surface than the first and second thin-film coils and connected to a surface of the first layer that is closer to the gap layer, the method comprising the steps of:
        forming a magnetic layer that is to be the first layer and has a wholly flat top surface;
        forming the first thin-film coil on the magnetic layer;
        forming the second layer on the magnetic layer after the first thin-film coil is formed;
        completing the first layer by patterning the magnetic layer after the second layer is formed;
        forming the second thin-film coil so that at least part of the second thin-film coil is disposed in a space between turns of the first thin-film coil;
        forming the gap layer on the second layer; and
        forming the second pole layer on the gap layer, the first thin-film coil and the second thin-film coil.

7. A method of manufacturing a thin-film magnetic head according to claim 6, wherein:
    in the step of forming the first thin-film coil, an insulating film for the first thin-film coil is formed on the magnetic layer in a region in which the first thin-film coil is to be formed; then, an electrode film for the first thin-film coil is formed to cover the magnetic layer and the insulating film for the first thin-film coil; and then electroplating is performed using the electrode film for the first thin-film coil to thereby form the first thin-film coil; and
    in the step of forming the second layer, a portion of the electrode film for the first thin-film coil other than a portion thereof underlying the first thin-film coil is removed before forming the second layer on the magnetic layer.

8. A method of manufacturing a thin-film magnetic head according to claim 6, wherein, in the step of completing the first layer, a mask layer is formed to cover the first thin-film coil and the second layer, and then a portion of the magnetic layer that is not covered with the mask layer is removed by etching, to thereby complete the first layer.

9. A method of manufacturing a thin-film magnetic head according to claim 6, wherein the step of forming the second thin-film coil includes the steps of:
    forming an inter-coil insulating film to cover the first thin-film coil;
    forming a first insulating layer to fill the space between the turns of the first thin-film coil;

forming a second insulating layer to cover the inter-coil insulating film and the first insulating layer;

polishing the second insulating layer so that the first insulating layer is exposed and top surfaces of the first and second insulating layers are flattened;

removing the first insulating layer from the space between the turns of the first thin-film coil; and forming the second thin-film coil so that at least part of the second thin-film coil is disposed in the space between the turns of the first thin-film.

10. A method of manufacturing a thin-film magnetic head according to claim 6, wherein the step of forming the second thin-film coil includes the steps of:

forming a first insulating layer to fill the space between the turns of the first thin-film coil;

forming a second insulating layer to cover the first insulating layer;

polishing the second insulating layer so that the first insulating layer is exposed and top surfaces of the first and second insulating layers are flattened;

removing the first insulating layer from the space between the turns of the first thin-film coil;

forming an inter-coil insulating film to cover the first thin-film coil; and forming the second thin-film coil so that at least part of the second thin-film coil is disposed in the space between the turns of the first thin-film coil.

11. A method of manufacturing a thin-film magnetic head according to claim 6, wherein the step of forming the second thin-film coil includes the steps of:

forming an inter-coil insulating film to cover the first thin-film coil;

forming an electrode film for the second thin-film coil to cover the inter-coil insulating film; and forming the second thin-film coil by electroplating using the electrode film for the second thin-film coil so that at least part of the second thin-film coil is disposed in the space between the turns of the first thin-film coil.

12. A method of manufacturing a thin-film magnetic head according to claim 6, wherein the first pole layer further includes a third layer, one of surfaces of the third layer being connected to a surface of the second layer closer to the gap layer, and the other one of the surfaces of the third layer being adjacent to the gap layer, the method further comprising the step of forming the third layer after the second thin-film coil is formed.

13. A method of manufacturing a thin-film magnetic head according to claim 12, wherein, in the step of forming the third layer, top surfaces of the first and second thin-film coils are flattened; then, a coil coat insulating film is formed to cover the top surfaces of the first and second thin-film coils; then, the third layer is formed on the second layer; and then top surfaces of the third layer and the coil coat insulating film are flattened.

14. A method of manufacturing a thin-film magnetic head according to claim 6, wherein the second pole layer is a flat layer.

15. A method of manufacturing a thin-film magnetic head comprising:

a medium facing surface that faces toward a recording medium;

a first pole layer and a second pole layer that are magnetically coupled to each other and include magnetic pole portions opposed to each other and located in regions of the pole layers on a side of the medium facing surface;

a gap layer provided between the magnetic pole portions of the first and second pole layers;

a thin-film coil at least part of which is disposed between the first and second pole layers and insulated from the first and second pole layers;

a lead layer disposed outside the first pole layer and connected to the thin-film coil; and a connecting layer for connecting the thin-film coil and the lead layer to each other, the method comprising the steps of:

forming a magnetic layer to be used for forming the first pole layer, the magnetic layer having a wholly flat top surface;

forming the thin-film coil on the magnetic layer;

forming the lead layer;

completing the first pole layer by patterning the magnetic layer, after the thin-film coil and the lead layer are formed;

forming the gap layer on the magnetic pole portion of the first pole layer;

forming the second pole layer on the gap layer and the thin-film coil; and forming the connecting layer after the first pole layer is completed.

16. A method of manufacturing a thin-film magnetic head according to claim 15, wherein the step of forming the connecting layer is performed at the same time as the step of forming the second pole layer.

17. A method of manufacturing a thin-film magnetic head comprising:

a medium facing surface that faces toward a recording medium;

a first pole layer and a second pole layer that are magnetically coupled to each other and include magnetic pole portions opposed to each other and located in regions of the pole layers on a side of the medium facing surface;

a gap layer provided between the magnetic pole portions of the first and second pole layers;

a thin-film coil at least part of which is disposed between the first and second pole layers and insulated from the first and second pole layers;

a lead layer connected to the thin-film coil;

a base layer underlying the lead layer; and a connecting layer for connecting the thin-film coil and the lead layer to each other, the method comprising the steps of:

forming a magnetic layer to be used for forming the first pole layer and the base layer, the magnetic layer having a wholly flat top surface;

forming the thin-film coil and the lead layer on the magnetic layer;

completing the first pole layer and the base layer after the thin-film coil and the lead layer are formed, the step of completing the first pole layer and the base layer including patterning the magnetic layer such that the base layer and the lead layer are disposed outside the first pole layer;

forming the gap layer on the magnetic pole portion of the first pole layer;

forming the second pole layer on the gap layer and the thin-film coil; and forming the connecting layer after the first pole layer is completed.

18. A method of manufacturing a thin-film magnetic head according to claim 17, wherein the step of forming the connecting layer is performed at the same time as the step of forming the second pole layer.

* * * * *